(12) United States Patent
Franklin

(10) Patent No.: US 11,283,727 B2
(45) Date of Patent: Mar. 22, 2022

(54) THIN DATA WARNING AND REMEDIATION SYSTEM

(71) Applicant: Triangle IP, Inc., Englewood, CO (US)

(72) Inventor: Thomas D. Franklin, Englewood, CO (US)

(73) Assignee: Triangle IP, Inc., Englewood, CO (US)

( * ) Notice: Subject to any disclaimer, the term of this patent is extended or adjusted under 35 U.S.C. 154(b) by 0 days.

(21) Appl. No.: 17/099,728

(22) Filed: Nov. 16, 2020

(65) Prior Publication Data

US 2021/0083990 A1 Mar. 18, 2021

Related U.S. Application Data

(63) Continuation of application No. 17/037,366, filed on Sep. 29, 2020, which is a continuation of application
(Continued)

(51) Int. Cl.
| | |
|---|---|
| *H04L 12/911* | (2013.01) |
| *G06N 20/00* | (2019.01) |
| *H04L 12/24* | (2006.01) |
| *G06N 5/04* | (2006.01) |
| *H04L 12/26* | (2006.01) |
| *H04L 47/83* | (2022.01) |
| *H04L 41/147* | (2022.01) |

(Continued)

(52) U.S. Cl.
CPC .............. *H04L 47/823* (2013.01); *G06N 5/04* (2013.01); *G06N 20/00* (2019.01); *H04L 41/0896* (2013.01); *H04L 41/12* (2013.01); *H04L 41/147* (2013.01); *H04L 43/045* (2013.01); *H04L 41/16* (2013.01)

(58) Field of Classification Search
None
See application file for complete search history.

(56) References Cited

U.S. PATENT DOCUMENTS

| | | |
|---|---|---|
| 6,219,649 B1 | 4/2001 | Jameson |
| 8,560,465 B2 | 10/2013 | Jeong et al. |
| (Continued) | | |

FOREIGN PATENT DOCUMENTS

| | | |
|---|---|---|
| CN | 101276345 A | 10/2008 |
| CN | 111325463 A | 6/2020 |
| (Continued) | | |

*Primary Examiner* — Mohamed Ibrahim

(57) ABSTRACT

The present disclosure describes a patent management system and method for remediating insufficiency of input data for a machine learning system. A plurality of data vectors using data are extracted from a plurality of data sources. A user input with respect to an input data context is received, the input data context correspond to a subset of the plurality of data elements. An input vector based on the user input is generated and a set of matching data vectors are determined from the plurality of data vectors based on the input vector. An insufficiency of the input data is determined based on a comparison of a number of matching data vectors with a first pre-determined threshold, and/or a variance with a second pre-determined threshold. Further, the set of matching data vectors are expanded by modifying the input vector when the input data is determined to be insufficient.

26 Claims, 14 Drawing Sheets

Related U.S. Application Data

No. 16/579,575, filed on Sep. 23, 2019, now Pat. No. 10,812,410, which is a continuation of application No. 16/378,335, filed on Apr. 8, 2019, now Pat. No. 10,425,353, which is a continuation-in-part of application No. 16/119,901, filed on Aug. 31, 2018, now Pat. No. 10,257,116, which is a continuation of application No. 15/882,948, filed on Jan. 29, 2018, now Pat. No. 10,069,759.

(60) Provisional application No. 62/831,025, filed on Apr. 8, 2019, provisional application No. 62/830,979, filed on Apr. 8, 2019, provisional application No. 62/824,172, filed on Mar. 26, 2019, provisional application No. 62/726,951, filed on Sep. 4, 2018, provisional application No. 62/535,456, filed on Jul. 21, 2017, provisional application No. 62/451,373, filed on Jan. 27, 2017.

(51) Int. Cl.
*H04L 41/12* (2022.01)
*H04L 41/0896* (2022.01)
*H04L 43/045* (2022.01)
*H04L 41/16* (2022.01)

(56) References Cited

U.S. PATENT DOCUMENTS

| | | | |
|---|---|---|---|
| 9,519,517 | B2 | 12/2016 | Dalgas et al. |
| 9,852,177 | B1* | 12/2017 | Cheung ................. G06F 16/245 |
| 10,095,992 | B1 | 10/2018 | Brestoff et al. |
| 2002/0107914 | A1 | 8/2002 | Charisius et al. |
| 2012/0130773 | A1 | 5/2012 | Abu-Ghazalah et al. |
| 2012/0191502 | A1 | 7/2012 | Gross et al. |
| 2013/0086033 | A1 | 4/2013 | Lundberg |
| 2013/0132302 | A1 | 5/2013 | Lundberg et al. |
| 2014/0055458 | A1 | 2/2014 | Bogdany et al. |
| 2014/0304197 | A1* | 10/2014 | Jaiswal ............... G06F 21/6209 |
| | | | 706/12 |
| 2015/0120717 | A1 | 4/2015 | Kim et al. |
| 2015/0160979 | A1* | 6/2015 | Moffitt .................. G06F 9/5066 |
| | | | 718/104 |
| 2019/0171928 | A1* | 6/2019 | Young ................ G06Q 30/0201 |
| 2020/0210440 | A1 | 7/2020 | Lundberg et al. |
| 2021/0064860 | A1* | 3/2021 | Tuma .................... G06K 9/6227 |
| 2021/0089942 | A1* | 3/2021 | Bigaj ....................... G06N 3/08 |

FOREIGN PATENT DOCUMENTS

| | | |
|---|---|---|
| KR | 101327546 B1 | 11/2013 |
| KR | 101651422 B1 | 8/2016 |
| WO | 2008127337 A1 | 10/2008 |

\* cited by examiner

Table 1 - Attorney

| UID | Name | Law Firm 1 | Law Firm 2 | Education Level | Education Focus | No. of Drafts | No. of Grants | Success Rate |
|---|---|---|---|---|---|---|---|---|
| A.01 | Sally J. Turner | Best LLP | Not So Best LLP | Doctorate | Computers | 100 | 76 | 98 |
| A.02 | Sara Tom | Tech LLP | Not Available | Doctorate | Chemical | 75 | 50 | 89 |
| A.03 | Jack Lee | A B LLP | Not Available | Doctorate | Mechanical | 60 | 45 | 85 |

Table 2 - Client

| UID | Name | Size | Tech Area 1 | Tech Area 2 | Location | Target |
|---|---|---|---|---|---|---|
| C.01 | X1 | Large | Mechanical | Auto | USA | 90% |
| C.02 | X2 | Large | Mechanical | Machine | USA | 80% |
| C.03 | X3 | Small | Healthcare | Nachine | China | 60% |

Table 3 - Law Firm

| UID | Name | Tech Area 1 | Tech Area 2 | Experience Years | No. of Drafts | No. of Grants | Location | Success Rate |
|---|---|---|---|---|---|---|---|---|
| F.01 | A1 | Mechanical | Auto | 45 | 10000 | 8760 | USA | 98 |
| F.02 | A2 | Mechanical | Machine | 42 | 9562 | 8130 | USA | 89 |
| F.03 | A3 | Healthcare | Nachine | 15 | 750 | 600 | Europe | 85 |

Table 4 - Year

| UID | Year of Filing | Year of Grant | Year of OA1 | Year of OA2 | Year of OA3 | Year of RCE | Year of Abandonment |
|---|---|---|---|---|---|---|---|
| Y.01 | 2010 | 2012 | 2010 | NA | NA | 2012 | NA |
| Y.02 | 2012 | 2015 | 2013 | 2015 | NA | 2015 | NA |
| Y.03 | 2015 | 2017 | 2015 | 2016 | 2016 | 2016 | NA |

Table 5 - Examiner

| UID | Name | Art Unit | Success Rate | Experience Years |
|---|---|---|---|---|
| E.01 | J D Lee | 2085 | 98 | 35 |
| E.02 | Robert K Hen | 1253 | 89 | 30 |
| E.03 | Lina Jack | 5685 | 84 | 15 |

FIG. 7

THIN DATA WARNING AND REMEDIATION SYSTEM

CROSS-REFERENCE TO RELATED APPLICATIONS

This application is a continuation of U.S. patent application Ser. No. 17/037,366, filed on Sep. 29, 2020; which is a continuation of U.S. patent application Ser. No. 16/579,575, filed on Sep. 23, 2019, now U.S. Pat. No. 10,812,410, issued on Oct. 20, 2020; which is a continuation of U.S. patent application Ser. No. 16/378,335, filed on Apr. 8, 2019, now U.S. Pat. No. 10,425,353, issued on Sep. 24, 2019; which application is a continuation-in-part of U.S. patent application Ser. No. 16/119,901, filed on Aug. 31, 2018, now U.S. Pat. No. 10,257,116, issued on Apr. 9, 2019; which application is a continuation of U.S. patent application Ser. No. 15/882,948, filed on Jan. 29, 2018, now U.S. Pat. No. 10,069,759, issued on Sep. 4, 2018; which application claims the benefit of and is a non-provisional of both U.S. Provisional Application No. 62/535,456, filed on Jul. 21, 2017, and U.S. Provisional Application No. 62/451,373, filed on Jan. 27, 2017; which are all hereby expressly incorporated by reference in their entirety for all purposes.

This application is a continuation of U.S. patent application Ser. No. 17/037,366, filed on Sep. 29, 2020; which is a continuation of U.S. patent application Ser. No. 16/579,575, filed on Sep. 23, 2019, now U.S. Pat. No. 10,812,410, issued on Oct. 20, 2020; which is a continuation of U.S. patent application Ser. No. 16/378,335, filed on Apr. 8, 2019, now U.S. Pat. No. 10,425,353, issued on Sep. 24, 2019; which application claims the benefit of and is a non-provisional of U.S. Provisional Application No. 62/830,979, filed on Apr. 8, 2019; U.S. Provisional Application No. 62/831,025, filed on Apr. 8, 2019; U.S. Provisional Application No. 62/824,172, filed on Mar. 26, 2019; and U.S. Provisional Application No. 62/726,951, filed on Sep. 4, 2018; which are each expressly incorporated by reference in their entirety for all purposes.

BACKGROUND

This disclosure relates in general to machine learning systems and, but not by way of limitation, to a thin data warning and remediation system for the machine learning system amongst other things.

Accuracy of results generated by machine learning systems are primarily dependent on quality of input data these systems receive. Further, quality of input data is based on quantity and variance of such data. If input data is thin, the results are skewed and generally not accurate. For example, if quantity of input data is low, the results are generally not accurate. Further, for example, if input data is large but variation in input data is low, the results are skewed towards type of data present in the input data.

Generally such skew in predicted results is noticed when the predictions of the machine learning system do not match the actual outcomes. Conclusions based upon skew will produce inaccurate predictions that will not match actual outcomes. In many circumstances, the best data is rare and not thick enough to avoid skew.

SUMMARY

One embodiment of the present disclosure describes a machine learning system that remediates data input problems when it is thin (i.e., not large enough or not variant enough). Where the input data is determined unreliable for performing a particular prediction, the input data is expanded according to a predetermined defocus scheme for the particular prediction. For example, the machine learning system makes a number of predictions from a large dataset of input data that is culled to the relevant data according to a filter for the particular prediction. When the culled input data is determined unreliable as having a confidence score below a predetermined threshold, more input data is gathered according to the predetermined defocus scheme that increases the dimension until the confidence score is beyond the predetermined threshold. As the input data is expanded, the certainty of the prediction will decrease and some embodiments quantify this in a certainty score. Machine learning is used to determine the confidence score and/or certainty score.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 7 is a schematic representation of organization of various components of data vectors, according to an embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
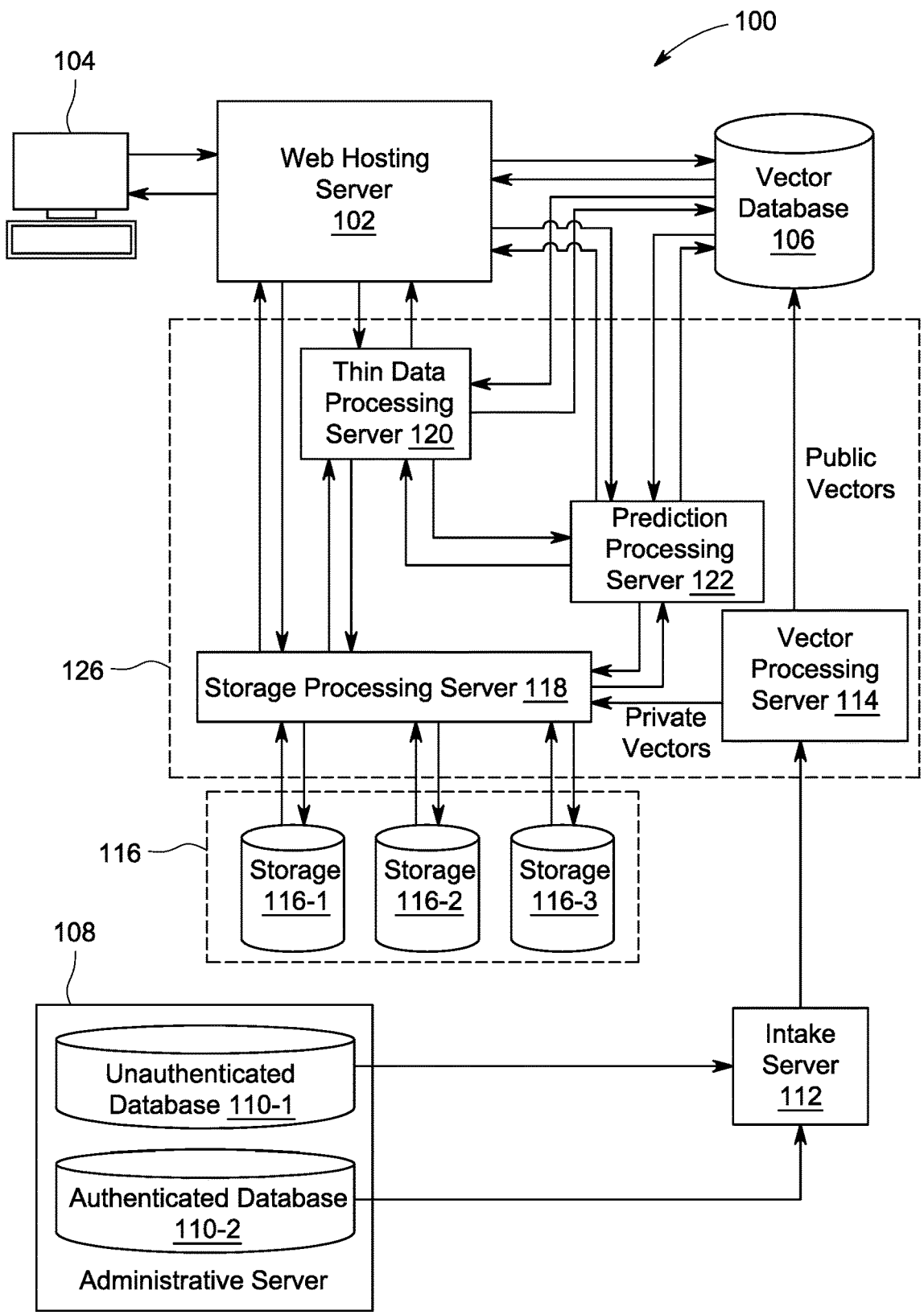
FIG. 1 illustrates a machine learning patent management system, according to an embodiment of the present disclosure.

FIG. 1 illustrates a machine learning patent management system 100, according to an embodiment of the present disclosure. The patent management system 100 includes a web hosting server 102 for hosting a web page and/or GUI through which a user device 104 or many user devices 104 (only one shown for simplicity) may interact. The user device 104 interacts with the web hosting server 102 via the internet or via some other type of network, e.g., local area network (LAN), wide area network (WAN), cellular network, personal area network (PAN), etc. The web hosting server 102 provides a software as a service (SaaS) delivery model in which the user device 104 accesses software via a web browser in a zero footprint configuration for the user device 104, but other embodiments could use enterprise software, handheld app or computer application software. The web hosting server 102 allows the user device 104 to download and/or install software that permits the user device 104 to use the patent management system 100. A web browser in the zero footprint configuration downloads software to work in conjunction with software on the web hosting server 102 to provide the functionality. Other embodiments could encapsulate some or all of the patent management system 100 on the user device, a local server, a remote server, a distributed group of servers, a single cloud computing providers, and/or spread it among multiple cloud computing providers.

The patent management system 100 includes a vector database 106 coupled with the web hosting server 102 for storing vectors such as data vectors (DVs) (not shown). DVs are data structures comprised of a number of data elements (DEs) corresponding to one or more dimensions (DMs). Each of the one or more DMs is a property associated with a domain to which the DVs belong. For example, as described herein, the DVs are related to the domain of patents and the one or more DMs includes attorney, client, law firm, timelines, examiner, art unit, tech center, international class, and other such attributes of the patent, prosecutor, examiner, etc. Thus, each of the multiple DEs is associated with a corresponding DM. For example, attorney name, years of experience, educational qualification, law firms where the attorney currently works or previously worked, number of patents prosecuted, number of patents drafted, number of patents granted, success rate, focus technology areas, average time lapse between patent filing and patent grant, etc. are the multiple DEs corresponding to the DM Attorney. DVs may be categorized as historical, predicted, hybrid, public, private, among other categorizations. DVs are described in greater detail with reference to FIGS. 6 and 7. The number of DVs included in a particular input data set can be modified (say, increased) according to a particular scheme (say, a particular defocus scheme) by modifying (say, increasing) the dimensionality of the DVs. For example, to expand the input data to include more DVs for a particular prediction, a particular defocus scheme can be applied in order to include more DE's corresponding to a particular DM or to remove restriction applied on the existing DE's corresponding to the particular DM. In some embodiments, the defocus schemes are predetermined and predefined. For example, in some embodiments, the particular defocus scheme can be determined based on domain knowledge. Alternatively, in some embodiments, machine learning can be used to determine the particular defocus scheme for modifying the dimensionality (i.e., expanding data in one or more DMs) while maintaining highest certainty of a prediction.

The patent management system 100 includes an administrative server 108 for generating and storing administrative data that may be maintained by a third party or mirrored locally from that third party. Administrative data is stored in various databases associated with the administrative server 108, including an unauthenticated database 110-1 and an authenticated database 110-2. The unauthenticated database 110-1 contains administrative data that is public while the authenticated database 110-2 contains administrative data that requires user authentication in order to access. Although the administrative server 108 is shown with both the authenticated database 110-2 and unauthenticated database 110-1, other embodiments could have those databases 110 on different servers and/or domains. An example of the administrative server 108 includes the Public or Private Patent Application Information Retrieval (PAIR) server hosted by the United States Patent and Trademark Office (USPTO) or retrieved from the USPTO databases. In this case, the unauthenticated database 110-1 (for example, the Public PAIR) could have public filings listed without full availability, but the authenticated database 110-2 (for example, the Private PAIR) would have more complete access with the ability to download electronic copies. The Private PAIR data is only given to authorized patent prosecutors who have power of attorney indicated with a customer number assigned to various patent applications and prosecution histories. The authenticated database 110-2 will maintain data segregation according to those users allowed to interact with their information. De-identified information may be harvested from the authenticated database 110-2 without revealing any of the trade secrets or confidential information.

This embodiment provides limited access to information in an unauthenticated manner and richer access in an authenticated manner to human accessible interfaces. Although this embodiment has the unauthenticated database 110-1 and the authenticated database 110-2, other embodiments may have some sort of validation for the unauthenticated database 110-1 such as a CAPTCHA or other validation of the user while others could have different levels of authentication for the databases such as limited access for unlicensed users and full access for licensed users. Validation is also used to be sure that users can only access their Private PAIR information stored in the authenticated database 110-2.

The patent management system 100 includes an intake server 112 that accesses the administrative server 108 and retrieves administrative data either continuously, periodically, or when prompted by another component within the patent management system 100 to do so. For example, prior to any process being performed within the patent management system 100 using administrative data, the intake server 112 may be prompted to verify that the administrative data being used is current and that no new administrative data is available. Some embodiments scrape the administrative server 108 while the user is interacting with the web hosting server 102. Other embodiments receive periodic e-mail, text, or other messages from the USPTO that triggers the administrative server 108 that updated information is available in PAIR that is selectively downloaded. In any event, the administrative server 108 is configured for human access to information in this embodiment so typical machine to machine transfer of information requires the intake server 112 to spoof a user account and scraping. Other embodiments could have APIs, distributed database, mirroring technology, and/or protocols such that the intake server 112 is unnecessary.

The patent management system 100 includes a vector processing server 114 that receives administrative data from the intake server 112 and generates DVs based on the administrative data. DVs that are generated based on administrative data from the unauthenticated database 110-1 are categorized as public vectors and may be sent to the vector database 106. DVs that are generated based on administrative data from the authenticated database 110-1 are categorized as private vectors and are sent to a storage processing server 118. The vector processing server 114 is described in greater detail in reference to FIG. 2. Domains of access to the private vectors are designed to match the scope of access to a user from the authenticated database 110-2, but could expand to a larger group of users, for example, attorney access to patent filing document could be shared with other users of the web hosting server 102 from the same company and/or law firm. Domains within any group can be designed to accommodate corporate, government or other classification levels to limit access to administrative data and their corresponding vectors.

The patent management system 100 includes storage 116 for storing user-specific information generated by and/or uploaded to the patent management system 100. The storage 116 differ from the vector database 106 in several respects. First, the storage 116 contains user-specific information (e.g., private vectors) that a user may want to keep private outside of a defined domain. Second, access to the storage 116 requires user authentication, whereas access to the vector database 106 does not require user authentication. Third, the storage 116 do not exclusively contain DVs 130 but may include other information such as user preferences, authenticated database login information and credentials, trade secret information, augments to the authentication data, expanded DVs, and/or data sufficiency determination and remediation rules. Contents of the storage 116 are described in greater detail in reference to FIG. 3. The storage 116 can be geofenced to a defined country or countries, stored in the cloud, stored behind a user's firewall, or/and stored on the user device 104.

The patent management system 100 includes a storage processing server 118 for maintaining the storage 116, maintaining domains, and otherwise controlling access. The storage processing server 118 serves two purposes. First, the storage processing server 118 identifies and selects the proper storage that a storage requestor is requesting access to, e.g., a first storage 116-1, a second storage 116-2, or third storage 116-3. Second, the storage processing server 118 verifies that the storage requestor has the proper authentication to access the specific storage being requested. The storage processing server 118 is described in greater detail in reference to FIG. 3. Although this embodiment shows the storage 116 being divided in three, other embodiments could have any number of divisions. These divisions could be physical or logical in various embodiments, for example, a user may wish that the information in their domain be stored on storage of their choice.

The patent management system 100 includes a thin data processing server 120 for evaluating sufficiency of input data for use in predictions by the machine learning patent management system 100, and for performing data expansion to remediate any insufficiency in the input data. In particular, the thin data processing server 120 retrieves DVs from the vector database 106 according to a filter for a particular prediction and evaluates the DVs in terms of quantity and quality before use in analysis by a prediction processing server 122. The thin data processing server 120 notifies or warns the user if the DVs are found to be insufficient for making the prediction with a high confidence score. Further, in some embodiments, the thin data processing server 120 expands the DVs in one or more DMs so as to provide sufficient DVs for analysis, thereby remediating insufficiency of the input data. In such embodiments, a number of possible DMs for data expansion may be determined by the thin data processing server 120 and suggested to the user. The user may then select the one or more suggested DMs for data expansion. Alternatively, in such embodiments, the one or more DMs for data expansion may be automatically dictated, as per a predetermined defocus scheme, to the thin data processing server 120. Generally, the confidence score of the prediction increases with expansion of the DMs, but the certainty score decreases. The increase in confidence score reflect better quality of input data (i.e., in terms of higher quantity and/or higher variance), while the decrease in certainty score reflect that the expanded input data is from less similar circumstances (i.e., less relevant to original context on which prediction was sought). The thin data processing server 114 is described in greater detail in reference to FIG. 4.

The patent management system 100 includes the prediction processing server 122 for generating predicted vectors (not shown). In particular, the prediction processing server 122 implements the machine learning model to generate the predicted vectors. The prediction processing server 122 retrieves data from the vector database 106, the storage 116, the web hosting server 102, and the thin data processing server 120. The prediction processing server 122 is described in greater detail in reference to FIG. 5 below.

In some embodiments, the vector processing server 114, the storage processing server 118, the prediction processing server 122, and the thin data processing server 120 may collectively be referred to as the processing server 126 (which may include a plurality of servers). Each of the servers within the processing server 126 may be owned and operated by a same or different entity managing the patent management system 100. In some embodiments, the processing server 126 further includes the storage 116, and the vector database 106. In some embodiments, the processing server 126 further includes the intake server 112. These various servers may be collocated or spread across the Internet or a WAN. Functions assigned to one server, database or block may be combined with others or separated in different embodiments.

Figure 2:
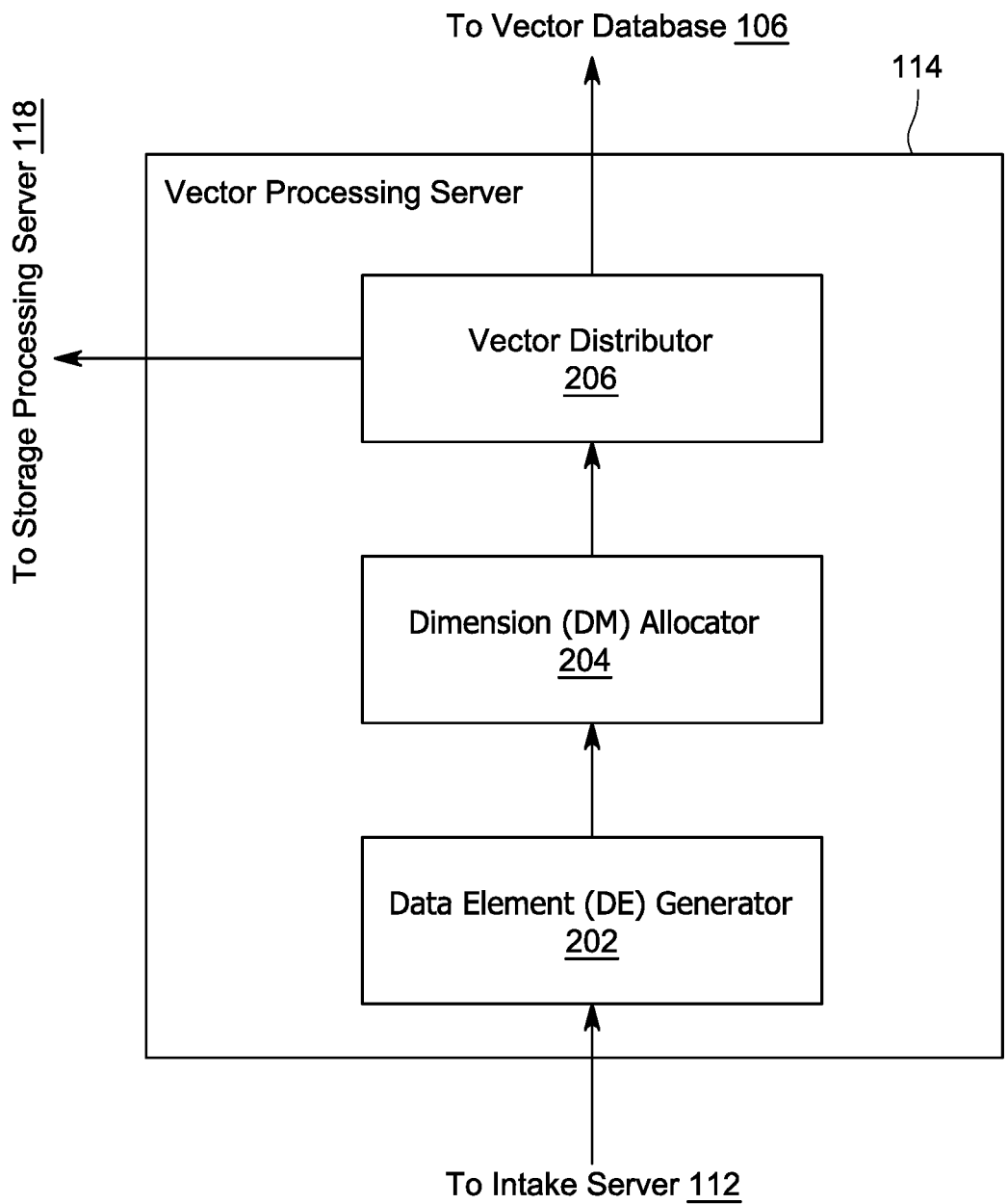
FIG. 2 illustrates a vector processing server, according to an embodiment of the present disclosure.

FIG. 2 illustrates the vector processing server 114, according to an embodiment of the present disclosure. The vector processing server 114 receives administrative data from the intake server 112, generates DVs based on the administrative data, and distributes the generated DVs to the storage processing server 118 and/or to the vector database 106. The vector processing server 114 includes a data element (DE) generator 202 that analyzes the administrative data, and generates and/or derives a number of DEs for each of the DVs. The DEs generator 202 automatically generates and/or derives the DEs from the administrative data and/or from user input. The user may also modify, delete, or add an existing DE in a DV. By way of example, consider that the administrative data includes the following record for a certain attorney Sally J. Turner working with a law firm Best LLP: 2 patent applications in the field of nanotechnology were filed in March, 2014 by Client A, both of which were granted in March 2016; 1 patent application in the field of software was filed in June 2014 by Client B, which was granted in Jan. 1, 2018; 2 patent applications in the field of power transmission were filed in December, 2014 by Client C, one of which was granted in March 2017 and one was abandoned after second Office Action. The DE generator 202 generates multiple DEs such as Attorney Name: Sally J. Turner, Firm Name: Best LLP, Status: Grant for 4 applications, Status: Abandoned for 1 application, Year of filing 2014 for 5 applications, Client Name: A for 2 applications, Client Name: B for 1 application, Client Name: C for 2 applications, Focus Areas: nanotechnology, software and power transmission and corresponding Art Units etc. These aforementioned DEs are generated directly from the administrative data. In some embodiments, the DEs may be derived from the administrative data as well. Examples of derived DEs include success rate for Sally J. Turner is 80%, average conversion time frame for applications filed by Sally J. Turner in the Focus Area of nanotechnology is 2 years, average conversion time frame for applications filed by Sally J. Turner is 2.5 years, and so forth.

The vector processing server 114 further includes a dimension (DM) allocator 204 which associates one or more DMs to each of the DEs in each of the DVs. A DM may indicate a characteristic or a property of a DE, and may be generated from the administrative data or from some other source. In some embodiments, the DM allocator 204 automatically generates the DMs from the administrative data and/or from user input (e.g., domain knowledge for a given domain). Alternatively, in some embodiments, the user may pre-define the DMs for a given domain. For example, the DMs with respect to the administrative data described above include but are not limited to: Attorney, Law Firm, Examiner, Client, Draft Attributes, Years, and the like. Further, the DM allocator 204 associates the DM "Law Firm" to the DE "Firm Name: Best LLP". The DM allocator 204 associates the DMs to the DEs automatically and/or with the help of inputs from the user. In some embodiments, a user may modify, delete, or add a DM associated with a DE. For example, the DM allocator 204 may apply the DMs "Attorney" to the DE "Firm Name: Best LLP" in DVs based on inputs from the user.

For example, as described herein, the DVs are related to the domain of patents and the one or more DMs includes attorney, client, law firm, timelines, examiner, and other such attributes of the patent. Thus, each of the multiple DEs is associated with a corresponding DM. For example, attorney name, years of experience, educational qualification, law firms where the attorney currently works or previously worked, number of patents prosecuted, number of patents drafted, number of patents granted, success rate, focus technology areas, average time lapse between patent filing and patent grant, etc. are the multiple DEs corresponding to the DM Attorney.

In some embodiments, the vector processing server 114 includes a vector distributor 206 for sending DVs to the storage processing server 118 and/or to the vector database 106. In some embodiments, a determination may be made as to whether a DV is public or private. This determination may be based on whether a corresponding data (e.g., patent application) is public (e.g., has been published by a patent office) or private (e.g., has not been published by the patent office). Public DVs may be sent to the vector database 106 and private DVs may be sent to the storage processing server 118. In some embodiments, the vector distributor 206 makes the determination as to whether a DV is public or private by searching for the corresponding administrative data within the unauthenticated database 110-1 and/or the authenticated database 110-2 (e.g., to identify the vector as public if a corresponding patent application is identified as a result of a query to the unauthenticated database 110-1 but not otherwise). In some embodiments, the vector distributor 206 makes the determination by analyzing a timestamp or date associated with the corresponding administrative data. In one embodiment, the administrative data expressly indicates whether the action or proceeding corresponding to the DV is public, private or partially one or the other. Information regarding correspondence between DEs and their respective DMs in each of DV's may be forwarded along with the DVs for storage in their respective databases.

Figure 3:
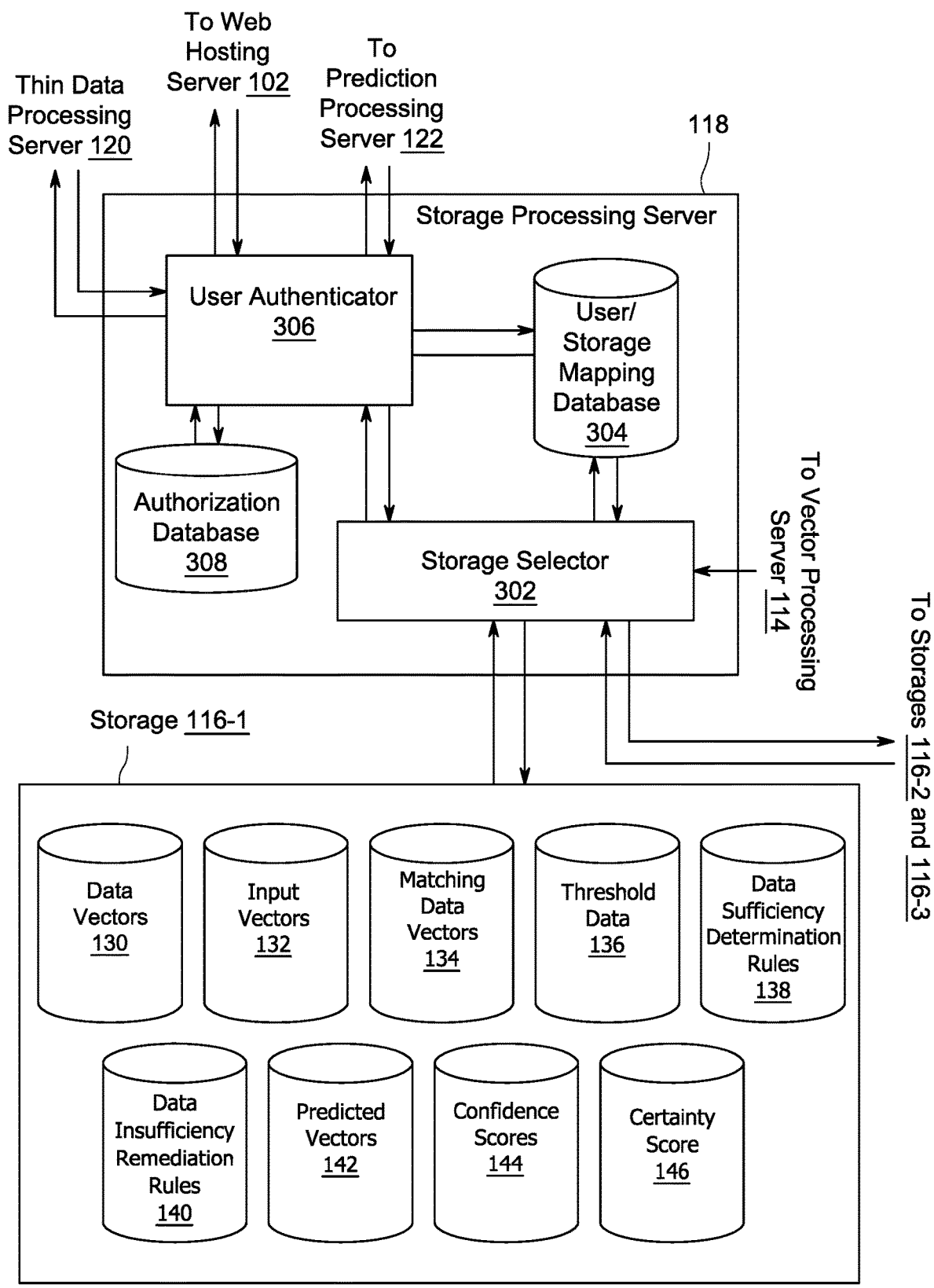
FIG. 3 illustrates a storage processing server and a storage, according to an embodiment of the present disclosure.

FIG. 3 illustrates the storage processing server 118 and storage 116-1, according to an embodiment of the present disclosure. The storage processing server 118 includes a storage selector 302 for identifying, selecting, and routing information to and/or from the proper storage that a storage requestor is requesting access to, e.g., storage 116-1, 116-2, or 116-3. To determine the proper storage to route information through, the storage selector 302 accesses a user/storage mapping database 304 which includes a mapping between users and storages. For example, the user/storage mapping database 304 may indicate that a first user has access to storage 116-1, a second user has access to storages 116-2 and 116-3, and a third user has access to storage 116-3. By way of another example, a private DV may be sent by the vector processing server 114 to the storage processing server 118 and the storage selector 302. The storage selector 302 may analyze the administrative data associated with the private DV to determine that the private DV corresponds to the first user. The storage selector 302 may then access the user/storage mapping database 304 to determine which storage the first user may access. After determining that the first user has access to storage 116-1, the storage selector 302 may route and store the private DV in the storage 116-1.

The storage processing server 118 includes a user authenticator 306 for verifying that a storage requestor has the proper authentication to access the specific storage being requested. The user authenticator 306 first determines which user is requesting access. Second, the user authenticator 306 accesses the authorization database 308 to determine whether the user has access to any of the storage 116. Third, the requester is routed to the storage selector 302 and/or the user/storage mapping database 304 for identifying and selecting the proper storage. In some embodiments, a storage requestor requests to access a specific storage, e.g., storage 116-1. In other embodiments, a storage requestor requests to access a non-specific storage, i.e., any available storage of the storage 116. For example, when a storage requestor requests to only store information in any available storage of the storage 116, the storage selector 302 may identify, select, and route information to any available storage to which the user is authorized to access.

The storage 116 includes various user-specific information including, but not limited to: DVs 130, input vectors 132, matching DVs 132, threshold data 136, data sufficiency determination rules 138, data insufficiency remediation rules 140 (e.g., predetermined defocus schemes), predicted vectors 142, confidence scores 144, and certainty scores 146. Learning algorithms can be used to determine the confidence scores 144 and certainty scores 146 for a particular prediction. The storage 116 also includes various information, such as data vectors 130, which are not user-specific and which may be generated by processing server 126. For example, in some embodiments, a copy of the vector database 106 may be included in the storage 116. In some embodiments, the storage 116 export private DVs 130 to the vector database 106 when they become public, based on updated administrative data from the administrative server 108, or based on a certain passage of time from when the private DVs 130 were first stored within the storage 116 or were first generated by the vector processing server 114.

Figure 4:
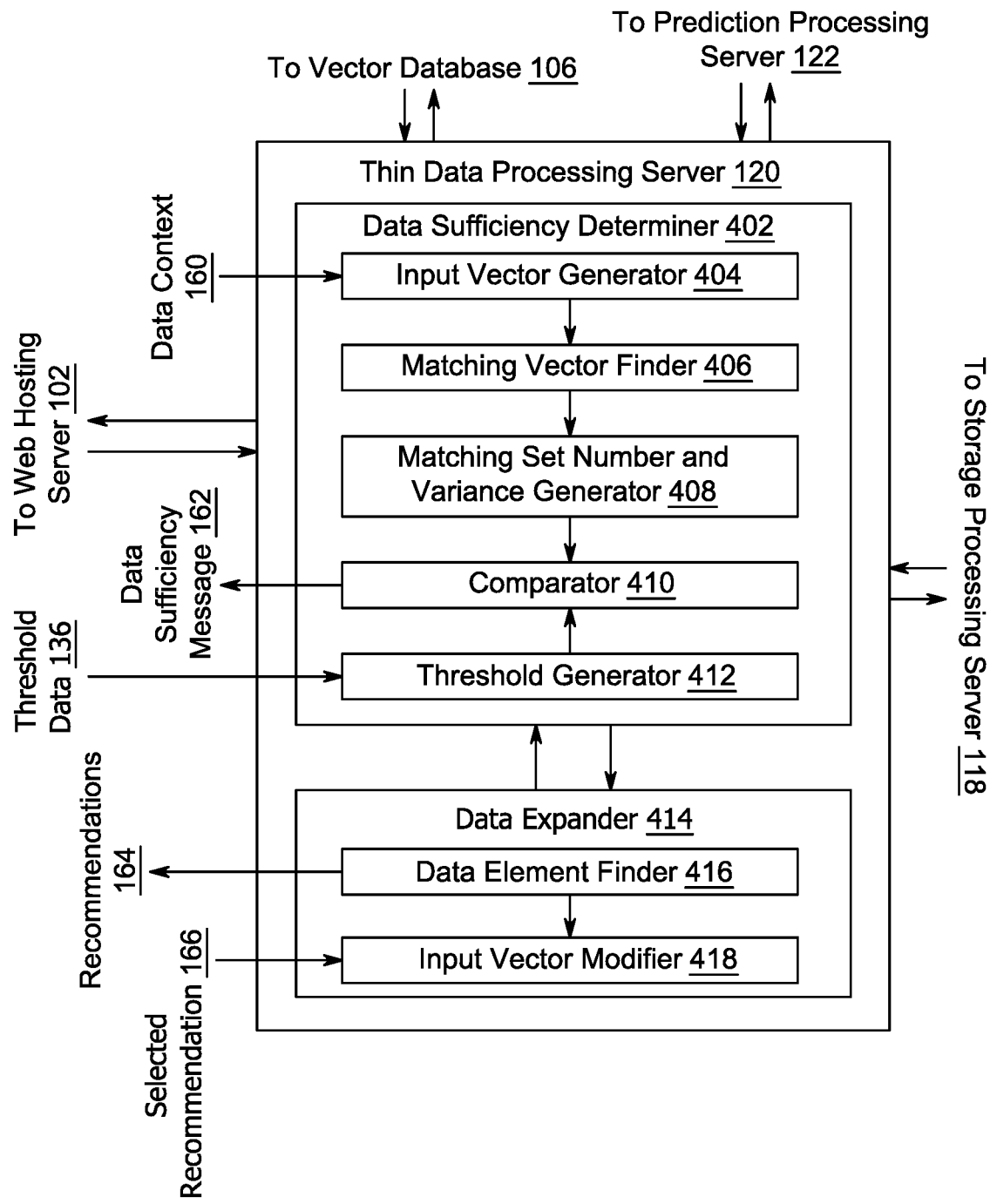
FIG. 4 illustrates a thin data processing server, according to an embodiment of the present disclosure.

FIG. 4 illustrates the thin data processing sever 120, according to an embodiment of the present disclosure. The thin data processing server 120 includes a data sufficiency determiner 402 for determining sufficiency of input data and accordingly generating a data sufficiency message 162. The data sufficiency determiner 402 includes an input vector generator 404 which receives a data context 160, analyses information of the data context 160, and generates an input vector (not shown) based on information of the data context 160. In some embodiments, the data context may be provided by the user. For example, the user may indicate a particular prediction to be performed and, therefore, indicate a context with respect to which input data for the particular prediction need to be aggregated. The data context 160 corresponds to one or more DEs of DVs. In particular, the data context 160 is parameters or conditions for each of the one or more DEs with respect to which a set of matching DVs 134 is to be aggregated. The set of matching DVs 134 is subsequently used as input data for the machine learning model implemented by the prediction processing server 122. The input vector generator 404 analyses the data context 160, and builds the input vector 132 based on the parameters or conditions for each of the one or more DEs. By way of example, the data context 160 provided by the user may be: All granted patents within last 5 years for an attorney Sally J. Turner and Law Firm Best LLP. The input vector generator 404 may retrieve the following DEs from the example context: Status: Granted, Year of Grant: 2018, Year of Grant: 2017, Year of Grant: 2016, Year of Grant: 2015, Year of Grant: 2014, Attorney name: Sally J. Turner, and Law Firm: Best LLP.

The data sufficiency determiner 402 includes a matching vector finder 406 which receives the input vector 132 generated by the input vector generator 404 and generates the set of matching DVs 134 based on the input vector 132. The matching vector finder 406 analyses all the DVs 130 and includes in the set of matching DVs 134 those DVs which are similar to the input vector 132. In other words, the set of matching DVs 134 includes DVs that meet parameters or conditions for each of the one or more DEs in the input vector 132. Continuing with the example described above, the matching vector finder 406 may find 5 DVs from among the all the DVs 130 that satisfy the input vector 132 derived from the data context 160. In other words, the matching vector finder 406 may find 5 DVs from among the all the DVs 130 that have DEs matching with the DEs of the input vector 132, i.e. 5 granted patents within last 5 years for attorney Sally J. Turner and Law Firm Best LLP. The set of matching DVs 134 are described in detail with reference to FIG. 8 below.

The data sufficiency determiner 402 includes a matching set number and variance generator 408, which receives the set of matching DVs 134 generated by the matching vector finder 406. The matching set number and variance generator 408 computes the number (N) of DVs included in the set of matching data vectors 134. The matching set number and variance generator 408 also computes variance (V) among the DVs included in the set of matching data vectors 134. The variance (V) in the set of matching DVs 134 may be computed based on one or more DEs of the DVs. For example, the variance (V) may be computed based on DE's such as family members, art units, technology focus areas, complexity of patent application, or the like. The variance (V) among DVs for related patent applications (i.e., belonging to same family) may be low, while the variance among DVs for unrelated patent applications may be higher. Similarly, variance (V) among DVs for patent applications belonging to same art units or same technology focus areas may be low, while the variance among DVs for patent applications belonging to different art units or different technology focus areas may be higher.

The data sufficiency determiner 402 includes a threshold generator 412 for generating a first threshold (FT) and a second threshold (ST). The first threshold is a pre-determined number of DVs deemed to be sufficient in the input data for the machine learning model. Similarly, the second threshold is a pre-determined variance among the DVs deemed to be appropriate in the input data for the machine learning model. In some embodiments, the threshold generator 412 retrieves FT and ST from the threshold data 316 provided by the user. In such embodiments, the FT and ST is pre-determined based on domain knowledge of the user. Alternatively, in some embodiments, the threshold generator 412 automatically generates the FT and ST by using the machine learning model implemented by the prediction processing server 122. In such embodiments, the threshold generator 412 receives a predicted output based on the set of matching DVs 134 from the prediction processing server 122, determines a degree of correspondence between the predicted output and a corresponding actual output, and determines the FT and the ST based on the degree of correspondence. The FT and the ST is not constant for all scenarios and is based on the DVs in the set of matching DVs 134 or a particular prediction to be performed by the machine learning model. Thus, the threshold data 136 received from the user may include multiple FTs and multiple STs for a number of different scenarios. Further, the threshold generator 412 may adjust the FT and the ST based on the DVs in the set of matching DVs 134.

The data sufficiency determiner 402 includes a comparator 410, which determines sufficiency of the set of matching DVs 134 as input data to the prediction processing server 122 and accordingly generates the data sufficiency message 162. The comparator 410 receives the number (N) of DVs and the variance (V) among DVs in the set of matching data vectors 134 generated by the matching set number and variance generator 408. The comparator 410 also receives the FT and the ST generated by the threshold generator 412.

The comparator 410 then compares the number (N) with the FT and the variance (V) with the ST. Further, the comparator 410 generates a data sufficiency message 162 based on the comparison as per data sufficiency determination rules 138. The data sufficiency message 162, based on result of the aforementioned comparison, includes one of a "Thin Data" alert (i.e., data is insufficient for a confident prediction) or a "Thick Data" alert (i.e., data is sufficient for a confident prediction).

As stated above, the comparator 410 determines sufficiency of the set of matching DVs 134 for input to the machine learning model as per data sufficiency determination rules 138. For example, the data sufficiency message is a "Thin Data" alert when the number (N) of matching DVs 134 is lesser than the FT and/or the variance (V) among the matching DVs 134 is lesser than the ST. The lesser number of DVs and/or lower variance among the DVs in the input data used for the machine learning model are undesirable since they can skew the predictions made by the machine learning model. By way of an example, let the first threshold (FT) be 10 and the second threshold (ST) be 0.35. If the number of DVs in the set of matching DVs 134 is 5 and the variance is above 0.35, the input data is determined to be insufficient and a thin data alert is generated, which is rendered on a GUI (described in detail with reference to FIG. 9) of the user device 104. Similarly, if the number of DVs in the set of matching DVs 134 is 15 and the variance is 0.25 because the set of matching DVs includes 2 patents families having 4 members each filed in different geographies, the input data is again determined to be insufficient and a thin data alert is again generated. However, if the number of DVs included in the set of matching DVs 132 is 12 and the variance above 0.35, the input data is determined to be sufficient and a thick data alert is again generated which is rendered on the GUI of the user device 104.

In some embodiments, the thin data processing server 120 includes a data expander 414 for expanding the set of matching data vectors 134 in order to remediate any insufficiency in the input data. In particular, when the comparator 410 determines that the input data is insufficient, the data expander 414 modifies the input vector 132 by modifying the subset of DEs of the input vector 132 in at least one of the DMs. The data expander 414 includes a data element finder 416 for generating recommendations 164 for modifications, and an input vector modifier 418 for generating a modified input vector based on recommendations 164. The data element finder 416 generates recommendations 164 by analyzing DEs and corresponding DMs of the set of matching data vectors 134 with respect to the DEs of the input vector, and by determining various modifications in the DEs of the input vector or various modifications in the parameters or constraints imposed on the DEs of the input vector. These modifications may be in the one or more DMs and may include, but may not be limited to, removing one or more DEs corresponding to the at least one of the DMs from the subset of DEs, or modifying one or more conditions imposed on one or more DEs in the at least one of the plurality of DMs in the subset of DEs. The objective of such modifications is to capture higher number of DVs or to capture DVs with higher variance as a part of the set of matching DVs 134. In some embodiments, the data element finder 416 determines various modifications in the DEs as per data insufficiency remediation rules 140. For example, the data insufficiency remediation rules 140 may include predetermined defocus schemes corresponding to various predictions that may be performed by machine learning model implemented by the prediction processing server 122.

As stated above, the particular defocus scheme can be determined based on domain knowledge or by using machine learning. Further, the data element finder 416 provides the recommendations 164 to the user for selection or directly to the input vector modifier 418 for generating a modified input vector. By way of example, the predetermined defocus scheme may be "to expand to data for all attorneys at similar experience level within the firm" if the data for a particular attorney in that firm is not sufficient to perform prediction with an accepted threshold level. By way of another example, the predetermined defocus scheme may be "to look for data with respect to supervisory Examiner" if the data for a particular Examiner is not sufficient to perform prediction with an accepted threshold level.

The input vector modifier 418 modifies one or more DEs in the subset of DEs based on the recommendations 164 so as to generate the modified input vector. In some embodiments, the user selects one of the recommendations 164 provided by the data element finder 416. The user may select one of the recommendations 164 based on his experience and/or domain knowledge. The input vector modifier 418 receives the selected recommendation 166 and generates the modified input vector. Alternatively, in some embodiments, the input vector modifier 418 selects one of the recommendations 164 as per the data insufficiency remediation rules 140 for the particular prediction. The data insufficiency remediation rules 140 rules may be 'to select recommendation with most number of DVs' or 'to select recommendation with highest variance among DVs'. Thus, the modified input vector may be generated with or without user inputs based on one of the recommendations 164. The generated modified input vector may be provided to the data sufficiency determiner 402. In some embodiments, the modified input vector is also presented to the user.

The data sufficiency determiner 402 receives the modified input vector and, again, determines sufficiency of the training data. The at least one of the first pre-determined threshold and the second pre-determined threshold is iteratively adjusted and provided to the threshold generator 412 based one or more DEs included in the modified input vector. The process of data expansion may be iteratively performed until the input data is thick enough for the prediction model. In particular, the process of data expansion may be repeated until the input data provides a confidence score for a given prediction that is beyond a predetermined threshold for that prediction. For example, in some embodiments, the input data is expanded by applying the pre-determined defocus scheme for a given prediction until a confidence score for the given prediction is beyond a predetermined threshold for that prediction.

Figure 5:
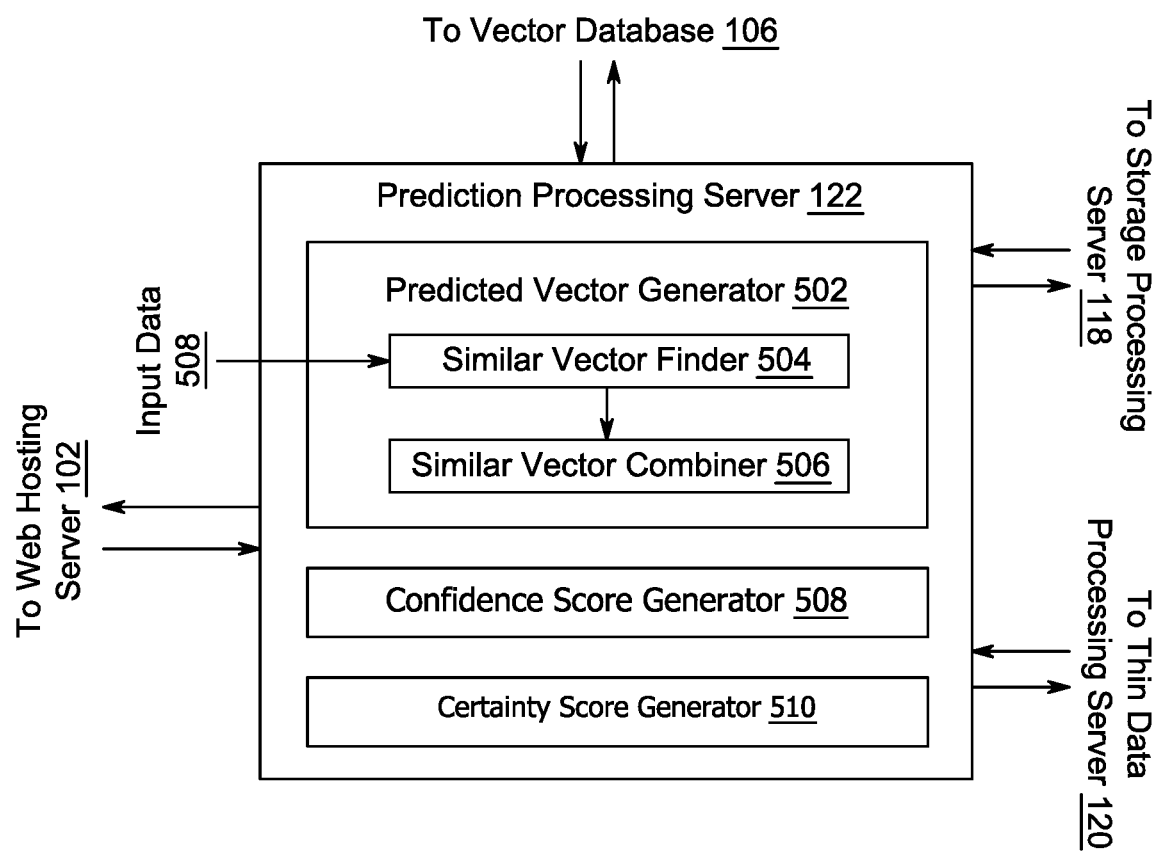
FIG. 5 illustrates a prediction processing server, according to an embodiment of the present disclosure

FIG. 5 illustrates the prediction processing server 122, according to an embodiment of the present disclosure. The prediction processing server 122 includes a predicted vector generator 502 for generating predicted vectors 142. The predicted vector generator 502 includes a similar vector finder 504 and a similar vector combiner 506, among other components. The similar vector finder 504 identifies a subset of similar DVs 130 based on the input data 508 (i.e. the set of matching DV's 134). The subset of similar DVs includes one or more DVs 130, each of which are similar to each other via the input data 508. For example, if input data 508 has an input DE "wireless technology", the similar vector finder 404 may search the vector database 106 and the storage 116 to identify a subset of DVs having the same or closely related DE. In some embodiments, the similar vector finder 404 correlates one or more input DEs with the DEs of the DVs 130 within the vector database 106 and the storage 116 to identify the subset of similar DVs.

In some embodiments, the similar vector finder 504 searches through all DVs 130 in the vector database 106 but only the DVs 130 within the storage 116 that the user is authorized to access. For example, a first user that is only authorized to access storage 116-1 may cause the similar vector finder 404 to search through all DVs 130 in the vector database 106 but only the DVs 130 in storage 116-1. In some embodiments, the similar vector finder 404 is allowed to search through other storages of the storage 116 that a user is not authorized to access only when DVs 130 retrieved from those storages would be unrecognizable. A group of DVs 130 are unrecognizable when they comprise less than some threshold, such as 1%, 5%, or 10% of the total DVs 130 included in the subset of similar DVs. In this manner, it would be difficult for a user of the patent management system 100 to trace a DV from the subset of similar DVs to another user. One benefit of allowing users to utilize DVs 130 from storages that they are not authorized to access is that it increases the accuracy of the predicted DVs 142, particularly in situations in which there may be few available DVs with DEs that are similar to the input DEs.

The similar vector finder 504 outputs the identified subset of similar DVs to the similar vector combiner 506, which combines the subset of similar DVs to generate a predicted DV 142. In some embodiments, the predicted DV 142 is generated by employing a machine learning model based on the subset of similar DVs. The machine learning model may be trained for generating the predicted vector by way of supervised or unsupervised learning based on an analysis of a large corpus of training data. The training data comprises input data (i.e., input DVs) with known outcome (known output DVs).

In some embodiments, the prediction processing server 122 includes a confidence score generator 508, which generates a confidence score 144 with respect to generated predicted DV 142. The confidence score 144 is generated using a statistical model or a machine learning model. As stated above, the confidence of prediction and, therefore, the confidence score 144 of the predicted DV 142 increases with increase in quality of input data 508 (i.e., higher number of matching DVs 134 with higher variance among them). The prediction processing server 122 is configured to generate the predicted DV 142 with a confidence score 144 above a predetermined threshold. However, if the confidence score 144 is below the predetermined threshold, the prediction processing server 122 may trigger the thin data processing server 120 to perform data expansion. In particular, the prediction processing server 122 may trigger the data expander 414 to expand the data as per the as per data insufficiency remediation rules 140 (e.g., predetermined defocus schemes) for the particular prediction being performed. In some embodiments, the prediction processing server 122 may also trigger the threshold generator 412 to update the FT and the ST for determining data insufficiency. The process may be iteratively repeated until the confidence score 144 is above the predetermined threshold In some embodiments, the prediction processing server 122 includes a certainty score generator 510, which generates a certainty score 146 with respect to generated predicted DV 142. The certainty score 146 is generated using a statistical model or a machine learning model. As stated above, the certainty of prediction and, therefore, the certainty score 146 of the predicted DV 142 may decrease with expansion of input data (i.e., dilution of original data context). Thus, decrease in certainty score 146 reflect that the expanded input data is from less similar circumstances (i.e., less relevant to original context) on which prediction was sought. For example, the certainty score 146 may be adversely affected when DMs selected for expanding the input data 508 increase variations in skills and performance of a person involved. By way of an example, let the input data 508 include DE Attorney Name: Sally J. Turner corresponding to DM Attorney, and let this input data 508 be expanded so as to perform prediction with higher confidence score 144. Now, if in the modified input data 508, the DE Attorney Name is replaced with DE Attorney Experience Level, the number of DVs in the set of matching DVs are likely to increase. However, since the DVs captured will relate to many different attorneys, each having varied skills and performance (e.g., different success rate, different training and expertise, etc.), the variations in the data captured is high. Due to such deviation in data context with respect to the original context, the certainty score 146 of the predicted DVs 142 is likely to be lower.

Figure 6:
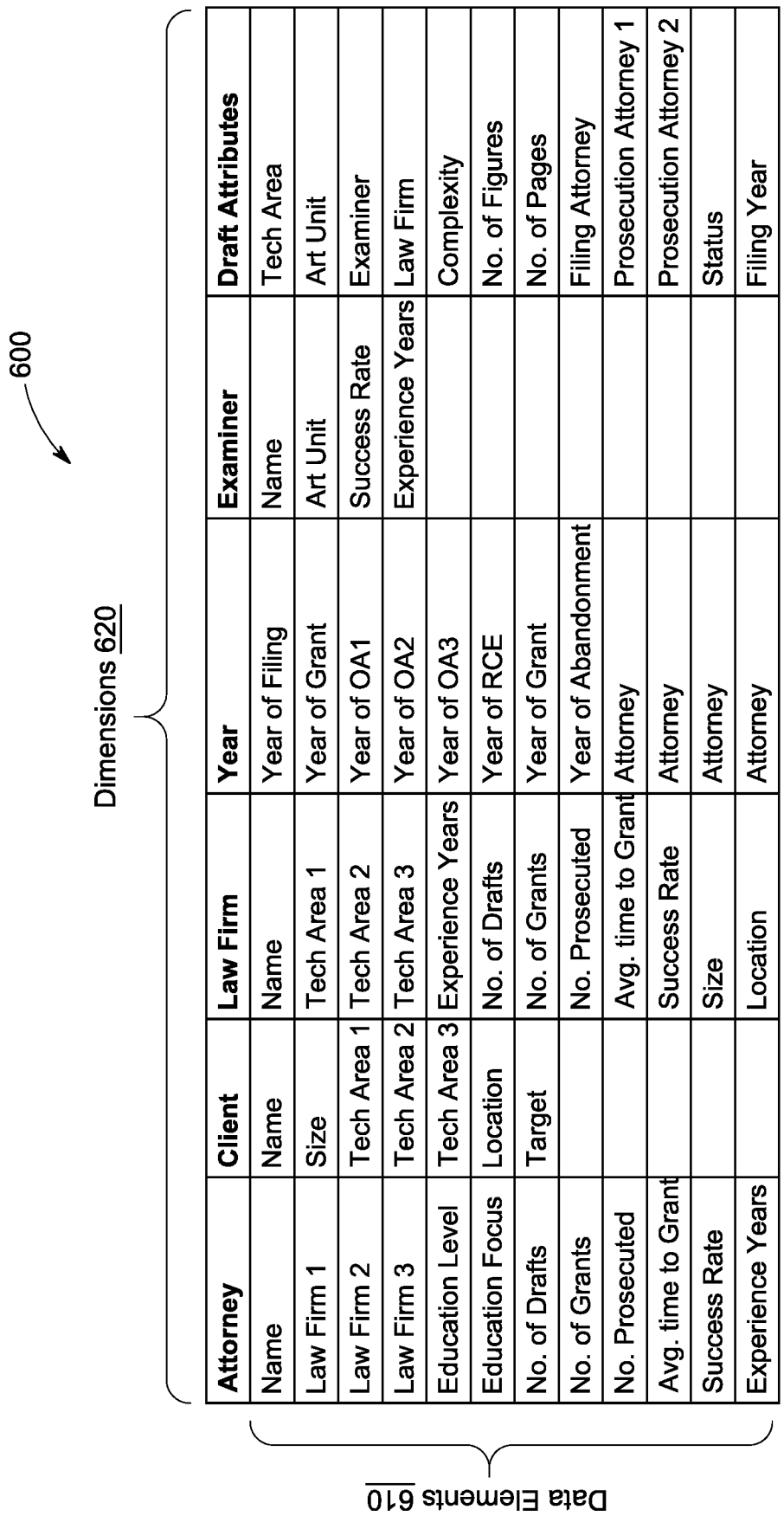
FIG. 6 is a schematic representation of various components of data vectors, according to an embodiment of the present disclosure.

FIG. 6 is a schematic representation of various components of DVs 130, according to an embodiment of the present disclosure. In some embodiments, the multiple components of the one or more DVs 130 may be organized as a two dimensional table 600. Each column of the table 600 correspond to a specific DM 620, which comprises multiple DEs 610. For example, and not as a limitation, table 600 has 6 columns corresponding to 6 different DMs 620, namely Attorney, Client, Law Firm, Year, Examiner and Draft Attributes. The column corresponding to DM attorney has 12 DEs, namely Name, Law Firm 1, Law Firm 2, Law Firm 3, Education Level, Education Focus, No. of Drafts, No. of Grants, No. Prosecuted, Avg. time to Grant, Success Rate and, Experience Years.

FIG. 7 is a schematic representation of organization of various components of DVs 130, according to an embodiment of the present disclosure. In some embodiments, the multiple components of the one or more DVs 130 may be organized as multiple related tables 700. The multiple related tables 700 may include traditional relational database tables, or more complex hash tables or hives. As illustrated, in some embodiments, there may be multiple relational database tables 702-710 such that each table correspond to one of the DMs. Further, each column of a particular table (say, table 702) may correspond to one of the multiple DEs that correspond to a DM represented by that table. Thus, each row of a given table comprises values for the multiple DEs. Each data instance is captured as a row in the table and has a unique ID. The unique IDs may reference each other as in relational database tables and may be used to retrieve DEs corresponding to other DMs and related to a particular instance. In alternative embodiments, information and components of the DVs 130 may be organized in more contemporary data structures including, but not limited to, hash tables, and hives.

Figure 8:
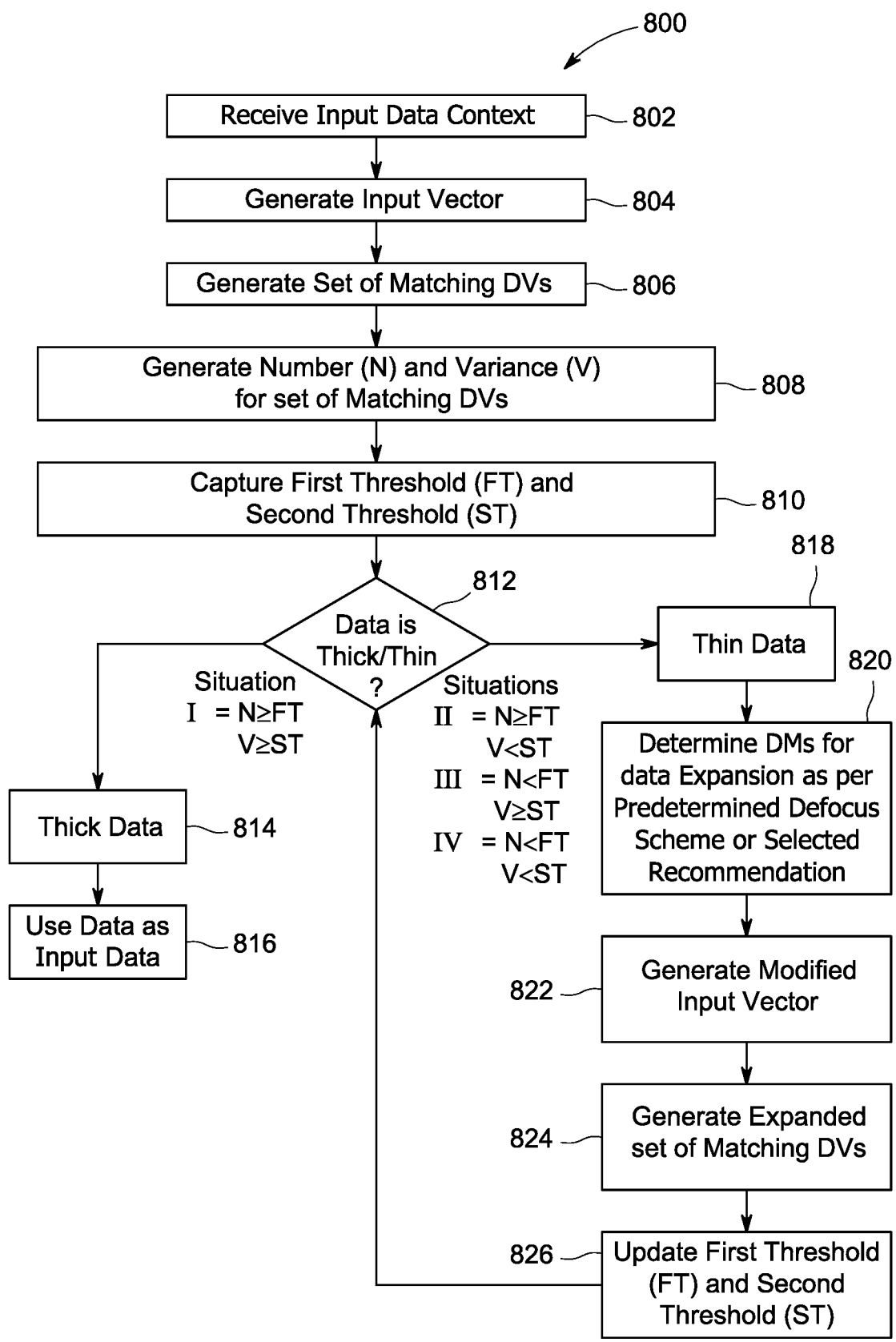
FIG. 8 illustrates a method for remediating insufficiency of input data for a machine learning system, according to an embodiment of the present disclosure.

FIG. 8 illustrates a method 800 for remediating insufficiency of input data of a machine learning system, according to an embodiment of the present disclosure. At step 802, the thin data processing server 120 receives an input data context from a user or from a prediction processing server 122. At step 804, the thin data processing server 120 generates the input vector 132 based on the input data context. At step 806, the thin data processing server 120 generates a set of matching DVs 134 from among the DVs 130 based on the input vector 132. The generation of the set of matching DVs 134 is described in detail with reference to FIG. 9 below. At step 808, the thin data processing server 120 determines the number (N) of the DVs included in the set of matching DVs 134 and variance (V) among the DVs included in the set of matching DVs 134. At step 810, the thin data processing server 120 captures the FT and the ST with respect to the matching DVs 134 and/or a given input data context (e.g., a given prediction). At step 812, the thin data processing server 120 determines whether the DVs captured in the set of matching DVs 134 is thin or thick with respect to the input data context. For example, but not as a limitation, four situations may arise: Situation I: N is more than or equal to FT and V is also more than or equal to ST; Situation II: N is more than or equal to FT but V is less than ST; Situation III: N is less than FT and V is more than or equal to ST; Situation IV: N is less than FT and V is also less than ST. In situation I, at step 814, the thin data processing server 120 determines the set of matching DVs 134 to be thick and adequate for use as input data to the machine learning model. Thus, at step 816, the thin data processing server 120 provides the set of matching DVs 134 as input data 508 to the prediction processing server 122. However, in situations II, III and IV, at step 818, the thin data processing server 120 determines the set of matching DVs 134 to be thin and insufficient for use as input data to the machine learning model. In such situations, the thin data processing server 120 expands the set of matching DVs 134 as per as per data insufficiency remediation rules 140 (e.g., predetermined defocus scheme).

When the set of matching DVs 134 is determined to be thin data, at step 820, the thin data processing server 120 determines DMs for expansion of input data (i.e., the set of matching DVs 134) as per the data insufficiency remediation rules 140 (e.g., predetermined defocus scheme). In some embodiments, the user may select a recommendation 166 from among multiple recommendations 164 provided for data expansion as per the data insufficiency remediation rules 140 (e.g., predetermined defocus scheme). Alternatively, in some embodiments, the recommendation may be automatically selected as per pre-defined rules. For example, the recommendation that may least dilute the input data context may be selected first or the recommendation that may result in highest number of DVs may be selected first. At step 822, the thin data processing server 120 generates a modified input vector based on the selected recommendation 166. At step 824, the thin data processing server 120 generates an expanded set of matching DVs based on the modified input vector. The expansion based on the selected recommendation 166 and modified input vector is described in detail with reference to FIG. 10 below. At step 826, the thin data processing server 120 may update the FT and the ST based on the expanded set of matching DVs and/or the input from the prediction processing server 122. In some embodiments, the method 800 returns to step 812 for determining data insufficiency based on the modified thresholds. If the thin data processing server 120 determines that data to be thick, the expanded set of matching DVs is used as input data the machine learning model. However, if the thin data processing server 120 determines the expanded set of matching DVs to be insufficient again, the method returns to step 820. Such expansion through step 820 to step 826 is iteratively performed till the expanded set of matching DVs is determined to be thick data.

Figure 9:
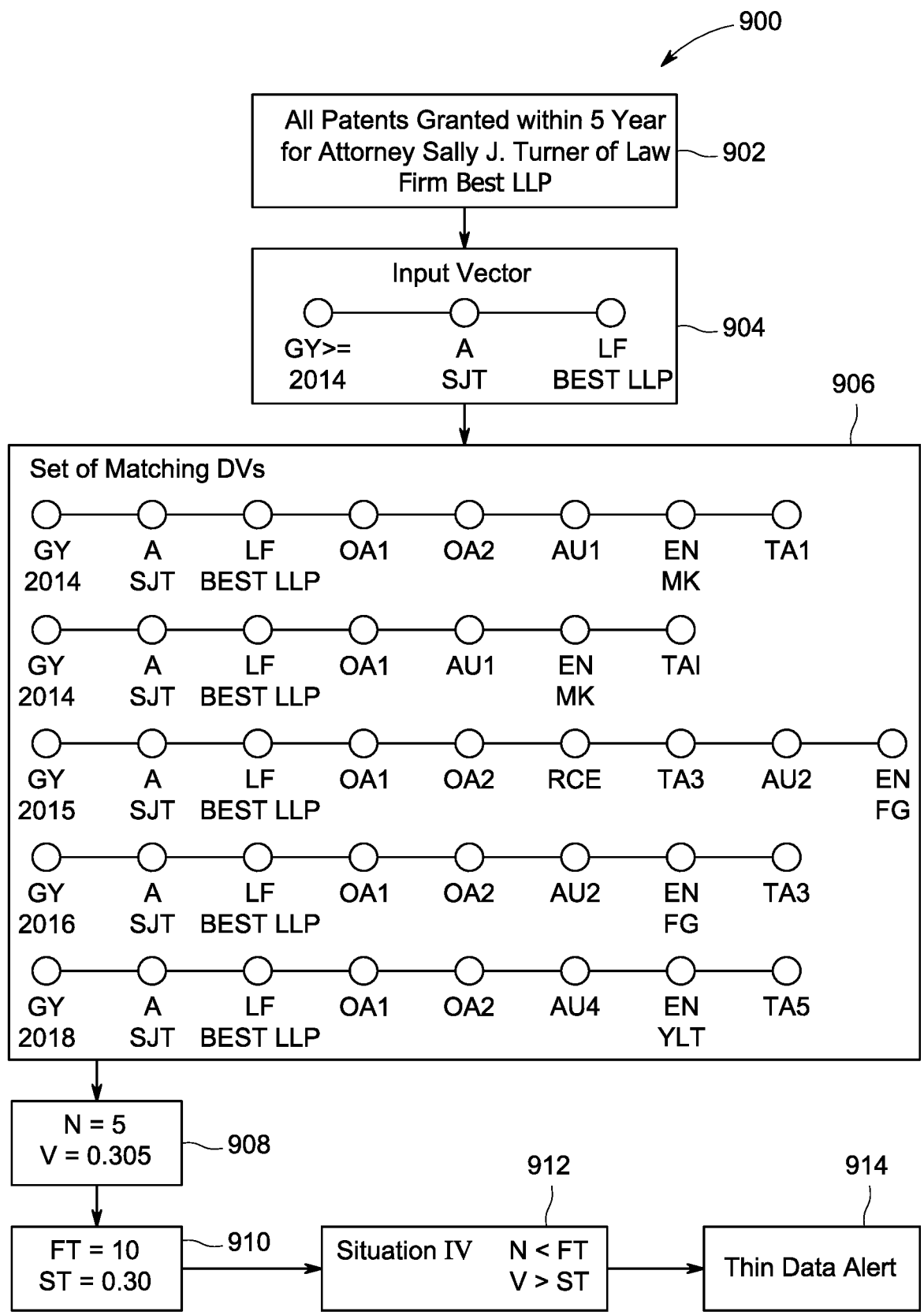
FIG. 9 is a schematic representation of the method for determining insufficiency of input data, according to an embodiment of the present disclosure.

FIG. 9 is a schematic representation 900 of the method for determination of insufficiency of the input data, according to an embodiment of the present disclosure. At block 902, the input data context is depicted as "All patents granted within 5 years for Attorney Sally J. Turner of Law Firm Best LLP". At block 904, the input vector 134 is depicted as a vector comprising three DEs: Grant Year (GY): greater than or equal to 2014 (i.e., which is 5 years from current year); Attorney Name: Sally J. Turner (SJT); and Law Firm: Best LLP. At block 906, the set of matching DVs 134 generated based on the input vector 134 is depicted. As an example, but not as a limitation, the set of matching DVs 134 is depicted to include 5 DVs with different number of DEs depending on various factors, such as events in the prosecution timeline among others. As illustrated, all DVs included in the set of matching DVs 134 minimally have 3 DEs which satisfy the input data context by matching with the 3 DEs of the input vector 134, namely, GY: greater than or equal to 2014, Attorney Name: SJT, and Law firm: Best LLP. Additionally, other DEs in the set of matching DVs may include: Office Action (OA), Art Unit (AU), Examiner Name (EN), Technology Area (TA), Request for Continued Examination (RCE), and so forth. At block 908, the number (N) of DVs and the variation (V) among the DVs included in the set of matching DVs 134 is depicted. As illustrated, N=5 and V=0.35. At block 910, the retrieved threshold data (i.e., the FT and the ST) is depicted. As illustrated, the FT is 10 and the ST is 0.30. At block 912, situation IV, as described with reference to FIG. 8, is depicted as N is less than the FT and V is greater than the ST. At block 914, thin data alert is generated. On generation of thin data alert, the input data (i.e., the set of matching DVs 134) is expanded.

Figure 10:
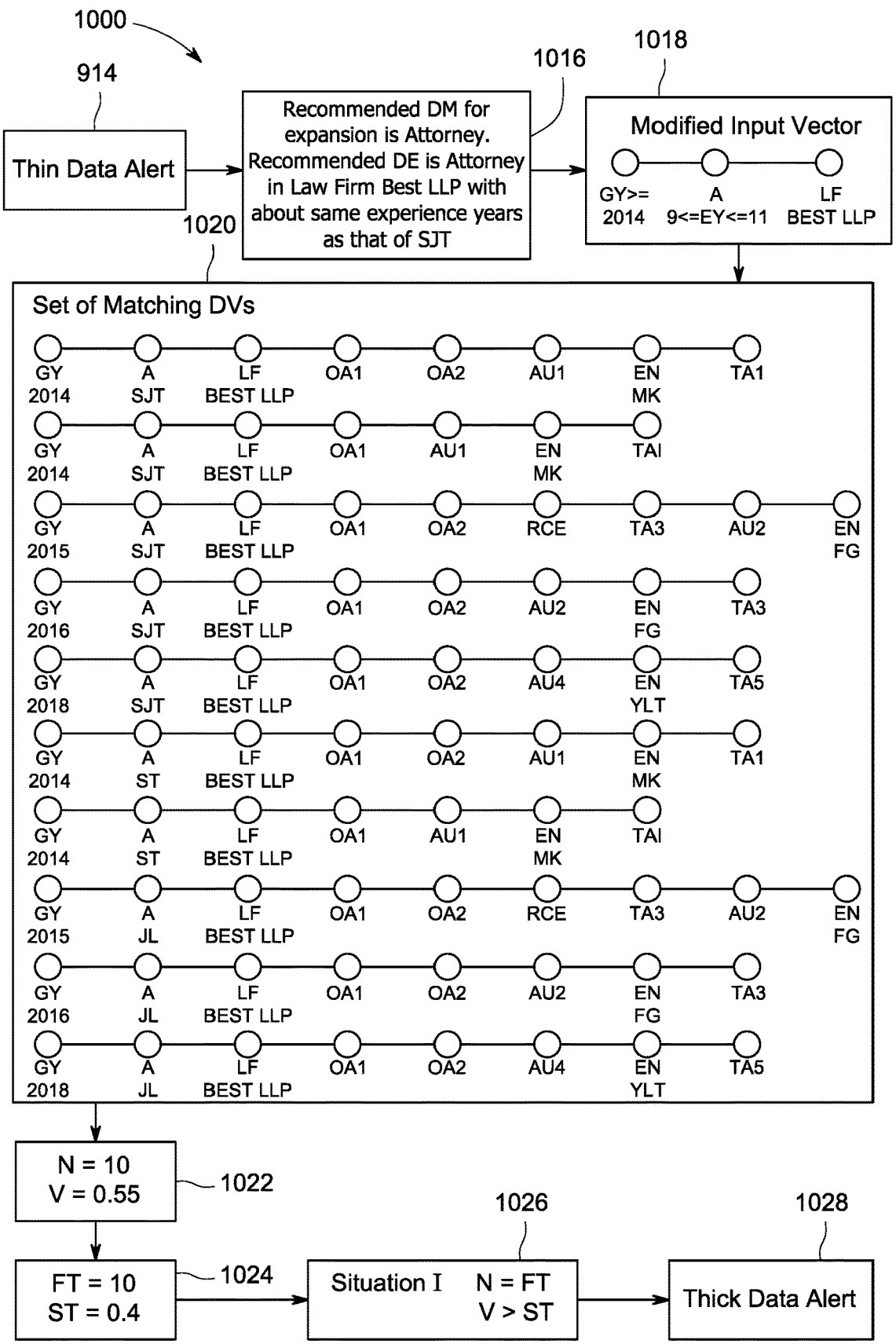
FIG. 10 is a schematic representation of the method for expanding input data, according to an embodiment of the present disclosure.

FIG. 10 is a schematic representation 1000 of the method for expansion of input data, according to an embodiment of the present disclosure. Starting from thin data alert depicted at block 914 of FIG. 9, the method of expansion moves to block 1016 where the data may be expanded in one of the recommended DM as per a predetermined defocus scheme. At block 1016, for example, one of the recommended DM for data expansion is depicted. For example, the recommended DM is attorney and the associated DE is "Experience years (EY) of Attorney SJT: 10". Thus, for example, DE Attorney: SJT is replaced by DE Attorney Experience: about 10 years. At block 1018, the modified input vector is depicted as a vector comprising three DEs: Grant Year (GY): greater than or equal to 2014 (i.e., which is 5 years from current year); Attorney Experience: greater than or equal to 9 years and less than or equal to 11 years; and Law Firm: Best LLP. In other words, the input vector expands in the DM of Attorney and DE of Attorney experience. At block 1020, the set of matching DVs 134 generated based on the modified input vector 134 is depicted. As an example, but not as a limitation, the set of matching DVs 134 is depicted to now include 10 DVs. As illustrated, at least some of the DVs included in the expanded set of matching DVs includes DE Attorney Name other than SJT, thereby increasing the number of DVs captured using the modified input vector. At block 1022, the number (N) of DVs and the variation (V) among the DVs included in the expanded set of matching DVs 132 is depicted. As illustrated, N=10 and V=0.55. At block 1024, the retrieved threshold data (i.e., the FT and the ST) is depicted. As illustrated, the FT is 10 and the ST is 0.40. At step, 1026, situation I, as described with reference to FIG. 8, is depicted as N is equal to FT and V is greater than ST. At step 1028, thick data alert is generated. On generation of thick data alert, the input data (i.e., the expanded set of matching DVs 134) is provided to the prediction processing server 122.

Figure 11A:
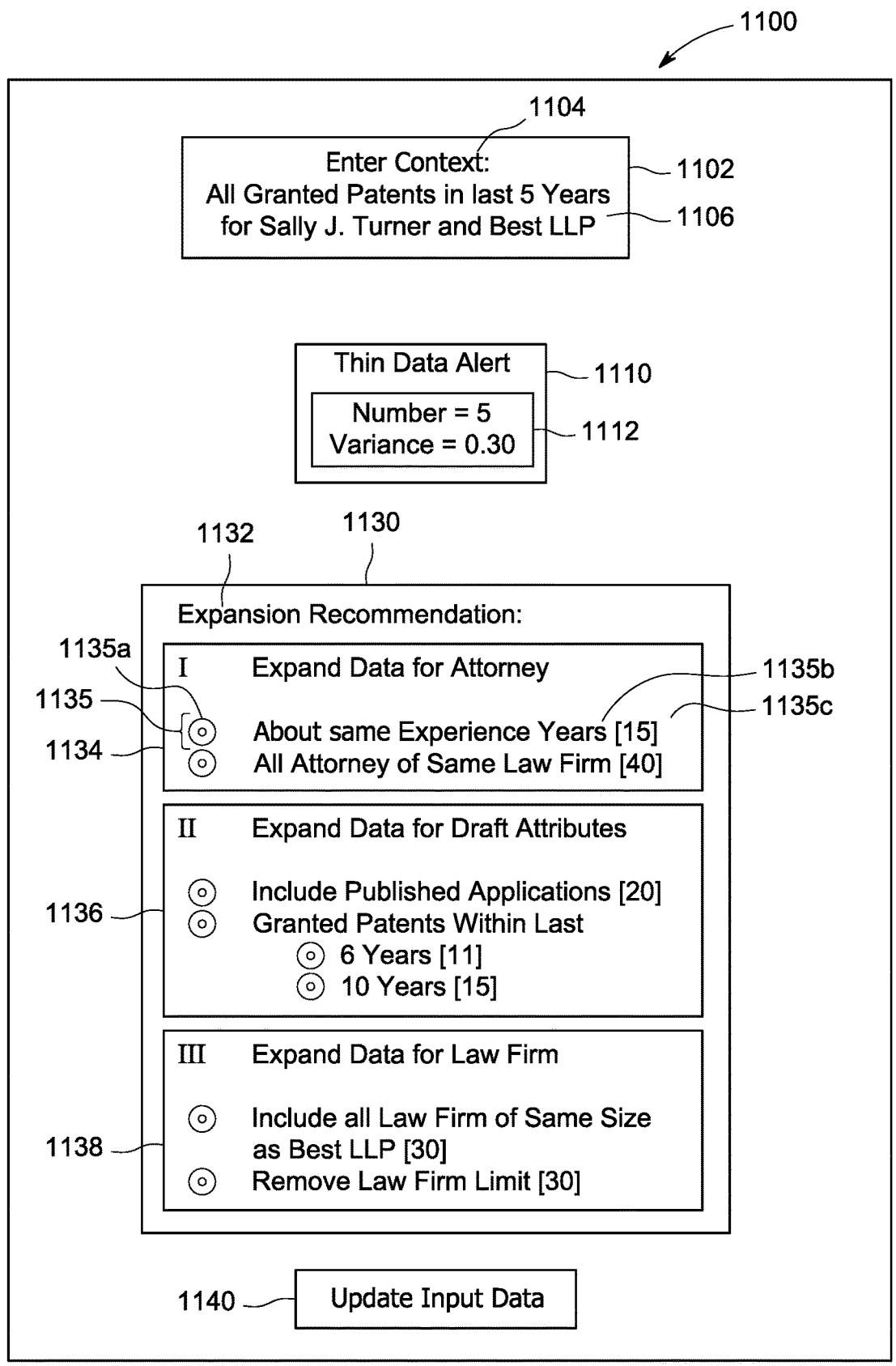
FIGS. 11A and 11B illustrate graphical user interface (GUI) associated with patent management system, according to an embodiment of the present disclosure.
Figure 11B:
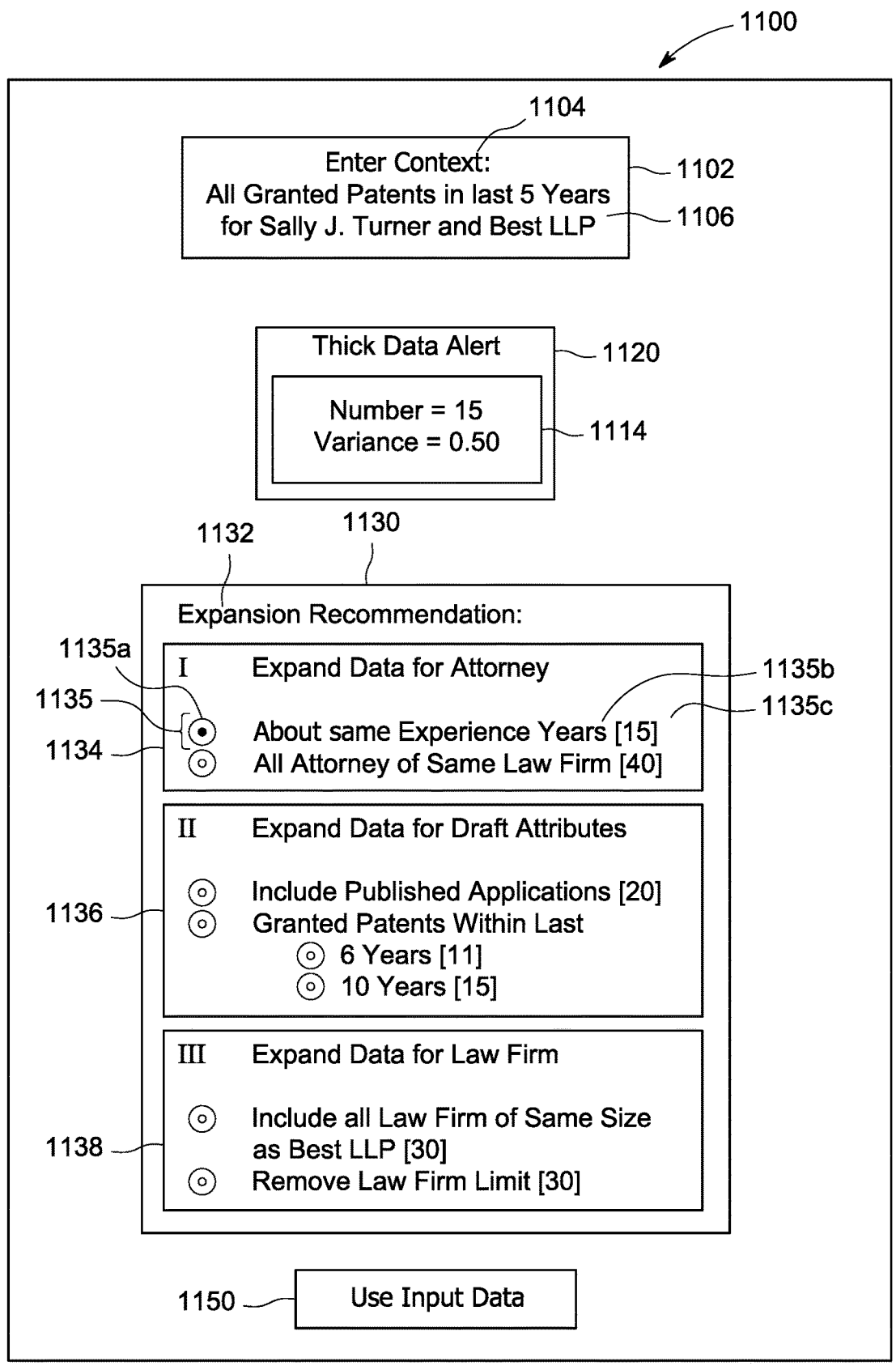

FIGS. 11A and 11B illustrates a graphical user interface (GUI) 1100 associated with the patent management system 100, according to an embodiment of the present disclosure. The GUI 1100 is generated by the web hosting server 102 in conjunction with the thin data processing server 120 and the prediction processing server 122 and is accessible by the user device 104 via the internet. The GUI 1100 may either be accessed via a web browser in the user device 104 or through an application (associated with the patent management system 100) installed on the user device 104. Once the GUI 1100 is operative on the user device 104, the GUI 1100 provides a user with an input data context section 1102 that includes prompt text 1104 prompting the user to key in the input data context in an input box 1106.

In some embodiments, the GUI 1100 includes a Thin Data Alert section 1110 and a Thick Data Alert section 1120. Depending on the determination made regarding sufficiency of data by, for example the comparator 410 in the thin data processing server and as described in step 812 of method 800, one of the Thin Data Alert Section 1110 or the thick Data Alert Section 1120 becomes active. When determination of sufficiency of data is made, with or without modifying the input vector for expansion of data in one or more DMs, the thick data alert section 1120 renders values of N and V in thick data statistics section 1114. The GUI 1100 includes a command button 1150 for using the input data, which becomes active along with the activation of the thick data alert section 1120. Clicking on the command button 1150 effects use of the set of matching DVs as input data for the machine learning model by the prediction processing server 122.

Alternatively, when determination of insufficiency of data is made, the thin data alert section 1110 renders values of N and V in thin data statistics section 1112. Further, the GUI 1100 includes an Expansion Recommendation section 1130, which becomes active along with the thin data alert section 1110. The expansion recommendation section 1130 includes one or more expansion recommendations 1132, each of which includes one or more DMs along with one or more corresponding DEs. As illustrated, the expansion recommendation section 1130 includes three expansion recommendation sections 1134, 1136, and 1138 corresponding to DMs Attorney, Draft Attributes, and Law Firm respectively. Each expansion recommendation section includes one or more DEs (shown as radio button options) corresponding to a particular DM. The DE may be selected to replace one or more DEs of the input vector. For example, the DM section 1134 includes two DEs: same or more experience years and, or all Attorneys of same law firm. Each of the one or more DEs, for example the DE 1135 may be rendered as a radio button 1135a, followed by text 1135b describing the DE, followed by a numerical value in square brackets 1135c indicating number of DVs that may be captured in the expanded set of matching DVs if the instant DE in the input vector is replaced for a selected DE of the corresponding DM. Thus, if DE Attorney Name: SJT in input vector captures 5 DVs in the set of matching vectors, replacing the same with DE Experience Years about same as that of SJT by selecting the radio button 1135a expands the number to captured DVs to 15. In some embodiments, the expansion of data may be carried out in more than one DMs. The GUI 1100 includes a command button 1140 for updating the input data, which becomes active along with the activation of the thin data alert section 1110. Clicking on the command button 1140 effects update of the set of matching DVs by the thin data processing server 120 as per the selected DM for expansion.

Figure 12:
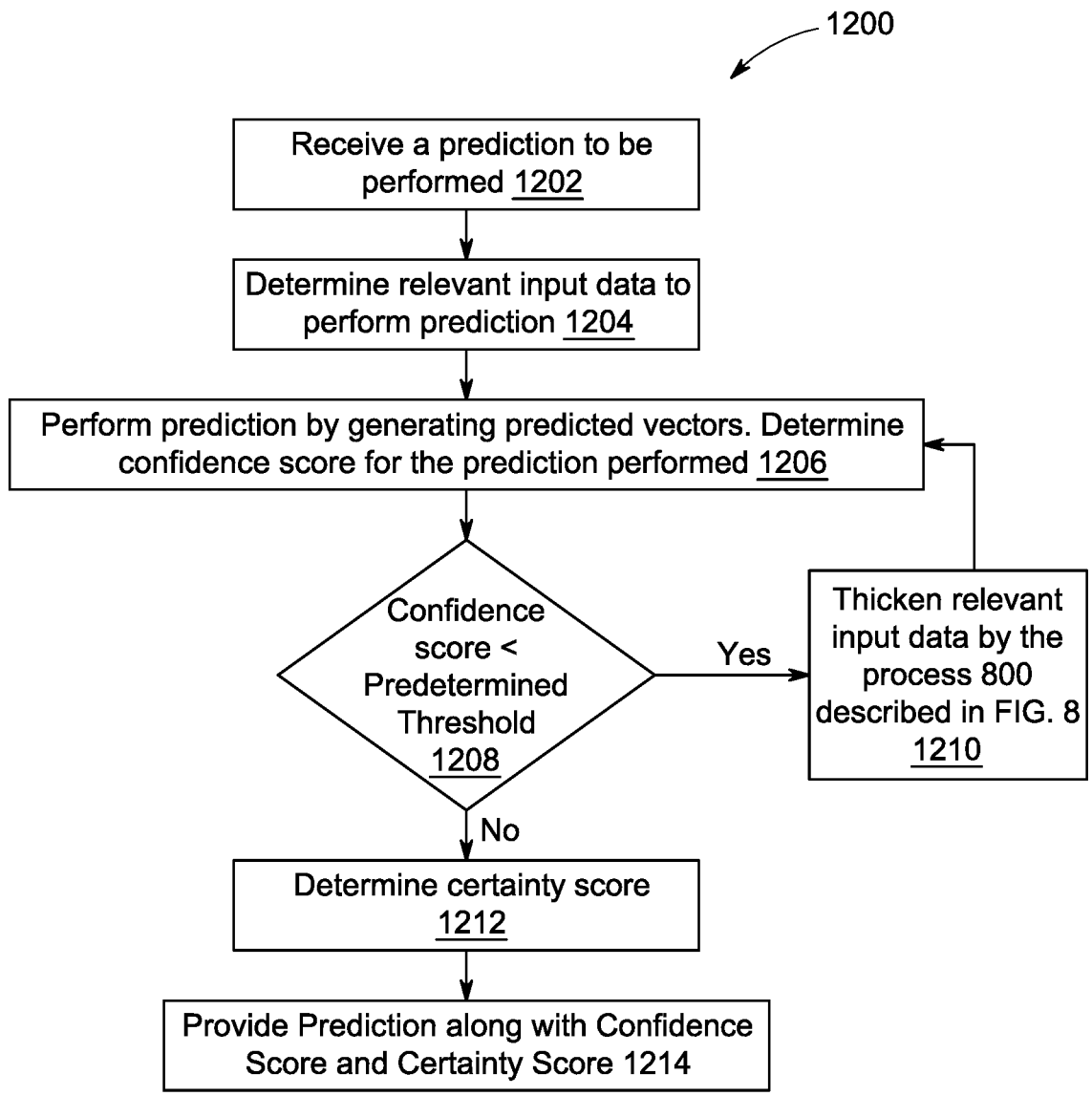
FIG. 12 illustrates a method for remediating insufficiency of input data for a machine learning system, according to an embodiment of the present disclosure.

FIG. 12 illustrates a method 1200 for remediating insufficiency of input data of a machine learning system, according to an embodiment of the present disclosure. At step 1202, the prediction processing server 122 receives a prediction to be performed from a user. At step 1204, the prediction processing server 122 determines relevant input data 508 to perform predictions. The relevant input data is determined from a large data corpus by applying appropriate filters based on the prediction to be performed. At step 1206, the prediction processing server 122 perform prediction by generating predicted vectors 142. Additionally, at step 1206, the prediction processing server 122 determines a confidence score 144 for prediction performed (i.e., the generated predicted vectors 142). At step 1208, the prediction processing server 122 determines whether the confidence score 144 is less than a predetermined threshold. If the confidence score 144 is less than the predetermined threshold, the prediction is unreliable. At step 1210, the prediction processing server 122 triggers the thin data processing server 120 to thicken the relevant input data for a more confident prediction. The thin data processing server 120 remediates insufficiency of input data by applying a predetermined defocus scheme for the given prediction as described in process 800 with reference to FIG. 8. Thus, more input data is gathered according to the predetermined defocus scheme that increases the dimension. The process 1200 goes back to step 1206 where the prediction is performed with the expanded input data. The process 1200 repeats until the confidence score 144 is determined to be equal to or beyond the predetermined threshold at step 1208. Once the confidence score 144 is determined to be equal to or above the predetermined threshold at step 1208, the prediction is reliable. At step 1212, the prediction processing server 122 determines the certainty score 146 for the prediction performed (i.e., the generated predicted vectors 142). At step 1214, the prediction processing server 122 provides the prediction along with the confidence score 144 and/or certainty score 146 for rendering.

Figure 13:
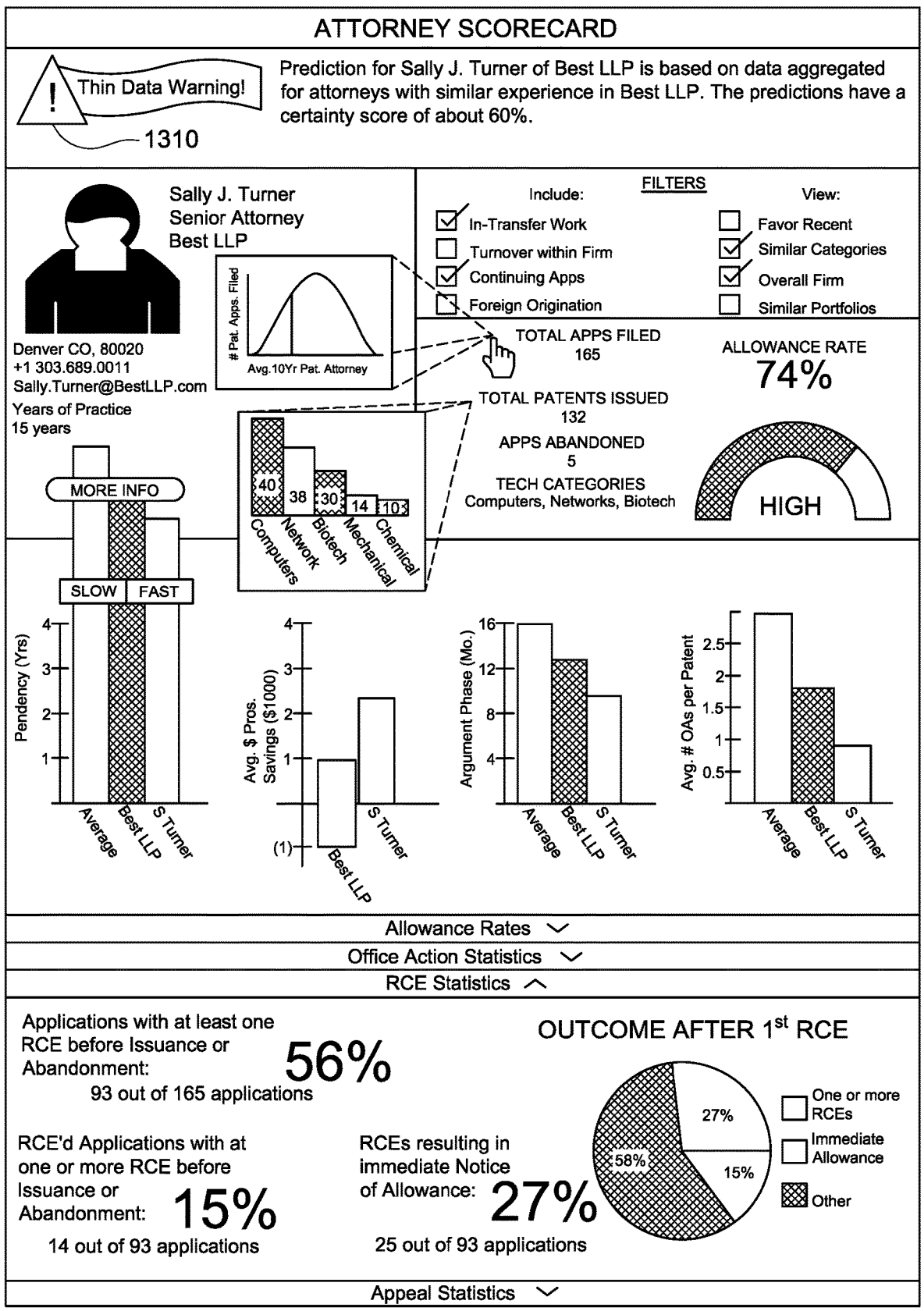
FIG. 13 illustrates a GUI associated with machine learning patent management system, according to an embodiment of the present disclosure.

FIG. 13 illustrates a GUI 1300 associated with the machine learning patent management system 100, according to an embodiment of the present disclosure. For example, the context for which data vectors are depicted in GUI 1300 is Scorecard of Attorney: Sally J. Turner of Law Firm: Best LLP. Various statistics and predictions for the Attorney: Sally J. Turner of Law Firm: Best LLP are depicted. These include direct DEs such as Total Patents Issued and Total Applications filed among others, and derived/predicted DEs such as Average $ Pros. Savings and Average #OAs per patent etc. Such detailed information may be presented for any DM for an extensive view and consumption. If the prediction was on basis of expanded data, such information is depicted as a disclaimer in section 1310 of GU 1300I. For example, as illustrated, the prediction for Attorney: Sally J. Turner of Law Firm: Best LLP was based on expanded data for attorney in Best LLP with about same years of experience as there was not enough data for Attorney: Sally J. Turner. This information is displayed as disclaimer in section 1310 of GUI 1300.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

What is claimed is:

1. A method for remediating insufficiency of input data for a machine learning system, the method comprising:
    generating a plurality of data vectors using data extracted from a plurality of data sources, wherein each of the plurality of data vectors comprise a plurality of data elements corresponding to a plurality of dimensions, wherein each of the plurality of dimensions is a property associated with a domain to which the plurality of data vectors belong;
    receiving a user input with respect to an input data context, wherein the input data context correspond to a subset of the plurality of data elements;
    generating an input vector based on the user input;
    developing the input data for the machine learning system by determining a set of matching data vectors from the plurality of data vectors based on the input vector;
    for the input data, determining at least one of:
        a number of matching data vectors in the set, or
        a variance among matching data vectors in the set; and
    determining the insufficiency of the input data based on a comparison of at least one of:
        the number of matching data vectors with a first pre-determined threshold, or
        the variance with a second pre-determined threshold; and
    expanding the set of matching data vectors by modifying the input vector when the input data is determined to be insufficient, wherein the input vector is modified by modifying the subset of the plurality of data elements in at least one of the plurality of dimensions.

2. The method for remediating insufficiency of input data for a machine learning system as recited in claim 1, further comprising:
    determining a confidence score for generating a predicted vector by the machine learning system based on the input data; and
    determining a certainty score for generating the predicted vector by the machine learning system based on the input data.

3. The method for remediating insufficiency of input data for a machine learning system as recited in claim 2, wherein expanding the set of matching data vectors comprises iteratively modifying the input vector by modifying the subset of the plurality of data elements in at least one of the plurality of dimensions until at least one of: a sufficiency of the input data for the machine learning system is achieved, and the confidence score is above a third pre-determined threshold.

4. The method for remediating insufficiency of input data for a machine learning system as recited in claim 1, further comprising determining at least one of the first pre-determined threshold and the second pre-determined threshold by:
    generating, by a machine learning model, a predicted output based on the set of matching data vectors;
    determining a degree of correspondence between the predicted output and a corresponding actual output; and
    determining at least one of the first pre-determined threshold and the second pre-determined threshold, based on the degree of correspondence.

5. The method for remediating insufficiency of input data for a machine learning system as recited in claim 1, further comprising iteratively adjusting at least one of the first pre-determined threshold and the second pre-determined threshold based on at least one or more data elements included in the modified subset of the plurality of data elements.

6. The method for remediating insufficiency of input data for a machine learning system as recited in claim 1, wherein the plurality of data sources comprises at least two of: an authenticated data source, an un-authenticated data source, and a private data source.

7. The method for remediating insufficiency of input data for a machine learning system as recited in claim 1, wherein the comparison comprises determining at least one of:
the number of matching data vectors being less than the first pre-determined threshold, or
the variance being less than the second pre-determined threshold.

8. The method for remediating insufficiency of input data for a machine learning system as recited in claim 1, wherein modifying the subset of the plurality of data elements in at least one of the plurality of dimensions comprises at least one of:
removing one or more data elements corresponding to the at least one of the plurality of dimensions from the subset of the plurality of data elements, or
modifying one or more conditions imposed on one or more data elements in the at least one of the plurality of dimensions in the subset of the plurality of data elements.

9. The method for remediating insufficiency of input data for a machine learning system as recited in claim 1, wherein the modification of the subset of the plurality of data elements in the at least one of the plurality of dimensions is effected automatically or is manually selected based on a recommendation, and wherein the automatic effecting or the recommendation is based on a number of matching data vectors the modified subset captures.

10. A patent management system for remediating insufficiency of input data for a machine learning system, the patent management system comprising:
at least one processor; and
at least one memory coupled with the at least one processor, wherein the at least one processor and the at least one memory having instructions are configured to:
generate a plurality of data vectors using data extracted from a plurality of data sources, wherein each of the plurality of data vectors comprise a plurality of data elements corresponding to a plurality of dimensions, wherein each of the plurality of dimensions is a property associated with a domain to which the plurality of data vectors belong;
receive a user input with respect to an input data context, wherein the input data context correspond to a subset of the plurality of data elements;
generate an input vector based on the user input;
develop the input data for the machine learning system by determining a set of matching data vectors from the plurality of data vectors based on the input vector;
for the input data, determining at least one of:
a number of matching data vectors in the set, or
a variance among matching data vectors in the set; and
determine the insufficiency of the input data based on a comparison of at least one of:
the number of matching data vectors with a first pre-determined threshold, or
the variance with a second pre-determined threshold; and
expand the set of matching data vectors by modifying the input vector when the input data is determined to be insufficient, wherein the input vector is modified by modifying the subset of the plurality of data elements in at least one of the plurality of dimensions.

11. The patent management system for remediating insufficiency of input data for a machine learning system as recited in claim 10, the at least one processor and the at least one memory having instructions are further configured to:
determine a confidence score for generating a predicted vector by the machine learning system based on the input data; and
determine a certainty score for generating the predicted vector by the machine learning system based on the input data.

12. The patent management system for remediating insufficiency of input data for a machine learning system as recited in claim 11, wherein the set of matching data vectors are expanded by iteratively modifying the input vector by modifying the subset of the plurality of data elements in at least one of the plurality of dimensions until at least one of:
a sufficiency of the input data for the machine learning system is achieved, and the confidence score is above a third pre-determined threshold.

13. The patent management system for remediating insufficiency of input data for a machine learning system as recited in claim 11, wherein the modification of the subset of the plurality of data elements in the at least one of the plurality of dimensions is effected automatically or is manually selected based on a recommendation, and wherein the automatic effecting or the recommendation is based on a number of matching data vectors the modified subset captures.

14. The patent management system for remediating insufficiency of input data for a machine learning system as recited in claim 10, wherein the at least one processor and the at least one memory having instructions are further configured to:
determine at least one of the first pre-determined threshold and the second pre-determined threshold by:
generate, by a machine learning model, a predicted output based on the set of matching data vectors;
determine a degree of correspondence between the predicted output and a corresponding actual output; and
determine at least one of the first pre-determined threshold and the second pre-determined threshold, based on the degree of correspondence.

15. The patent management system for remediating insufficiency of input data for a machine learning system as recited in claim 10, wherein the at least one processor and the at least one memory having instructions are further configured to iteratively adjust at least one of the first pre-determined threshold and the second pre-determined threshold based on at least one or more data elements included in the modified subset of the plurality of data elements.

16. The patent management system for remediating insufficiency of input data for a machine learning system as recited in claim 10, wherein the plurality of data sources comprises at least two of: an authenticated data source, an un-authenticated data source, and a private data source.

17. The patent management system for remediating insufficiency of input data for a machine learning system as recited in claim 10, wherein the comparison comprises determination of at least one of:

the number of matching data vectors being less than the first pre-determined threshold, or the variance being less than the second pre-determined threshold.

18. The patent management system for remediating insufficiency of input data for a machine learning system as recited in claim 10, wherein to modify the subset of the plurality of data elements in at least one of the plurality of dimensions, the at least one processor and the at least one memory having instructions are further configured to:

remove one or more data elements corresponding to the at least one of the plurality of dimensions from the subset of the plurality of data elements, or modify one or more conditions imposed on one or more data elements in the at least one of the plurality of dimensions in the subset of the plurality of data elements.

19. A patent management system for remediating insufficiency of input data for a machine learning system, the patent management system comprising:

a vector processing server is configured to:

generate a plurality of data vectors using data extracted from a plurality of data sources, wherein each of the plurality of data vectors comprise a plurality of data elements corresponding to a plurality of dimensions, wherein each of the plurality of dimensions is a property associated with a domain to which the plurality of data vectors belong; and a thin data processing server is configured to:

receive a user input with respect to an input data context, wherein the input data context correspond to a subset of the plurality of data elements;

generate an input vector based on the user input;

develop the input data for the machine learning system by determining a set of matching data vectors from the plurality of data vectors based on the input vector;

for the input data, determining at least one of:

a number of matching data vectors in the set, or a variance among matching data vectors in the set; and determine the insufficiency of the input data based on a comparison of at least one of:

the number of matching data vectors with a first pre-determined threshold, or the variance with a second pre-determined threshold; and expand the set of matching data vectors by modifying the input vector when the input data is determined to be insufficient, wherein the input vector is modified by modifying the subset of the plurality of data elements in at least one of the plurality of dimensions, wherein the modification of the subset of the plurality of data elements in the at least one of the plurality of dimensions is effected automatically or is manually selected based on a recommendation.

20. The patent management system for remediating insufficiency of input data for a machine learning system as recited in claim 19, wherein:

a prediction processing server is configured to:

determine a confidence score for generating a predicted vector by the machine learning system based on the input data; and determine a certainty score for generating the predicted vector by the machine learning system based on the input data.

21. The patent management system for remediating insufficiency of input data for a machine learning system as recited in claim 20, wherein the set of matching data vectors are expanded by iteratively modifying the input vector by modifying the subset of the plurality of data elements in at least one of the plurality of dimensions until at least one of: a sufficiency of the input data for the machine learning system is achieved, and the confidence score is above a third pre-determined threshold.

22. The patent management system for remediating insufficiency of input data for a machine learning system as recited in claim 19, wherein the thin data processing server is further configured to:

determine at least one of the first pre-determined threshold and the second pre-determined threshold by:

generate, by a machine learning model, a predicted output based on the set of matching data vectors;

determine a degree of correspondence between the predicted output and a corresponding actual output; and determine at least one of the first pre-determined threshold and the second pre-determined threshold, based on the degree of correspondence.

23. The patent management system for remediating insufficiency of input data for a machine learning system as recited in claim 19, wherein the thin data processing server is further configured to iteratively adjust at least one of the first pre-determined threshold and the second pre-determined threshold based on at least one or more data elements included in the modified subset of the plurality of data elements.

24. The patent management system for remediating insufficiency of input data for a machine learning system as recited in claim 19, wherein the comparison comprises determination of at least one of:

the number of matching data vectors being less than the first pre-determined threshold, or the variance being less than the second pre-determined threshold.

25. The patent management system for remediating insufficiency of input data for a machine learning system as recited in claim 19, wherein to modify the subset of the plurality of data elements in at least one of the plurality of dimensions, the thin data processing server is further configured to:

remove one or more data elements corresponding to the at least one of the plurality of dimensions from the subset of the plurality of data elements, or modify one or more conditions imposed on one or more data elements in the at least one of the plurality of dimensions in the subset of the plurality of data elements.

26. The patent management system for remediating insufficiency of input data for a machine learning system as recited in claim 19, wherein the automatic effecting or the recommendation is based on a number of matching data vectors the modified subset captures.

* * * * *